(12) United States Patent
Segev

(10) Patent No.: US 9,538,321 B2
(45) Date of Patent: Jan. 3, 2017

(54) LOCATION DETERMINATION OF WIRELESS STATIONS USING ONE-TO-MANY COMMUNICATION TECHNIQUES

(71) Applicant: INTEL IP CORPORATION, Santa Clara, CA (US)

(72) Inventor: Jonathan Segev, Tel Mond (IL)

(73) Assignee: Intel IP Corporation, Santa Clara, CA (US)

(*) Notice: Subject to any disclaimer, the term of this patent is extended or adjusted under 35 U.S.C. 154(b) by 129 days.

(21) Appl. No.: 14/335,346

(22) Filed: Jul. 18, 2014

(65) Prior Publication Data

US 2016/0021495 A1  Jan. 21, 2016

(51) Int. Cl.
| | |
|---|---|
| H04W 24/00 | (2009.01) |
| H04W 4/02 | (2009.01) |
| H04W 64/00 | (2009.01) |
| H04W 84/18 | (2009.01) |
| H04W 4/22 | (2009.01) |
| H04W 40/20 | (2009.01) |

(52) U.S. Cl.
CPC .............. *H04W 4/02* (2013.01); *H04W 4/023* (2013.01); *H04W 4/22* (2013.01); *H04W 40/20* (2013.01); *H04W 64/00* (2013.01); *H04W 84/18* (2013.01)

(58) Field of Classification Search
CPC ........ H04W 84/18; H04W 64/00; H04W 4/02; H04W 4/021; H04W 4/22; H04W 76/007; H04W 4/023; H04W 4/08; H04W 40/20; H04W 84/12; H04L 41/12; H04M 11/04; H04M 3/5116; H04M 7/006; H04M 1/72533
USPC ........................ 455/456.1, 404.2, 41.2, 457, 456.2, 455/456.3, 456.5, 41.1, 456.6, 432.1; 370/328, 370/338, 255, 400, 252
See application file for complete search history.

(56) References Cited

U.S. PATENT DOCUMENTS

| | | | | |
|---|---|---|---|---|
| 2005/0242927 A1* | 11/2005 | Friedrich | ........... | G06K 7/10019 340/10.2 |
| 2011/0111726 A1* | 5/2011 | Kholaif | ..................... | G01S 1/68 455/404.2 |
| 2011/0291882 A1* | 12/2011 | Walsh | ..................... | G01S 19/46 342/357.29 |
| 2012/0324520 A1* | 12/2012 | Van Deventer | ....... | H04L 65/605 725/109 |
| 2014/0092797 A1* | 4/2014 | Chu | .................. | H04W 52/0216 370/311 |
| 2014/0187259 A1* | 7/2014 | Kakani | ................. | H04W 64/00 455/456.1 |

* cited by examiner

*Primary Examiner* — Fred Casca
(74) *Attorney, Agent, or Firm* — Sutherland Asbill & Brennan LLP

(57) ABSTRACT

Certain embodiments herein relate to efficient location determination by wireless stations using one-to-many communication techniques. Location determination can be facilitated by using one-to-many communication techniques to provide for efficient timing message exchange between an initiating wireless station and one or more responding wireless stations. Based at least in part on the time-of-flight of the exchanged messages, the initiating wireless station can determine its distances from the respective one or more responding wireless stations. Based at least in part on the determined distances, the wireless initiating station can determine its location using trilateration or multilateration techniques.

22 Claims, 7 Drawing Sheets

LOCATION DETERMINATION OF WIRELESS STATIONS USING ONE-TO-MANY COMMUNICATION TECHNIQUES

BACKGROUND

Wireless devices are increasingly dependent upon their location as context for various applications. In some approaches, an initiating wireless station (e.g., a wireless communication device) can determine its relative location by communicating with responding wireless stations (e.g., wireless access points). Such approaches can involve analyzing communications between the initiating wireless station and the responding wireless station to help determine the initiating wireless station's location relative to the responding wireless stations. In high volume settings, in which a relatively large number of initiating wireless stations are simultaneously, or nearly simultaneously, attempting to determine their positions using responding wireless stations, the resource load on the responding wireless stations can lead to significant decreases in responding wireless station performance. For example, increased loads on a responding wireless station can result in reduced performance, inefficiencies and lack of availability for other, non-location determination functions. Additionally, location determination services can also lead to significant decreases in performance of wireless stations (e.g., access points) that do not provide location determination functionality. For example, in a high volume setting, the shared medium can be over used (e.g., crowded), leading to reduced performance on wireless stations not involved in providing location determination functionality. In one such example, a wireless access point downloading streaming video or audio will have limited available bandwidth due to the bandwidth being used by the location determination functionality of other wireless access points.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
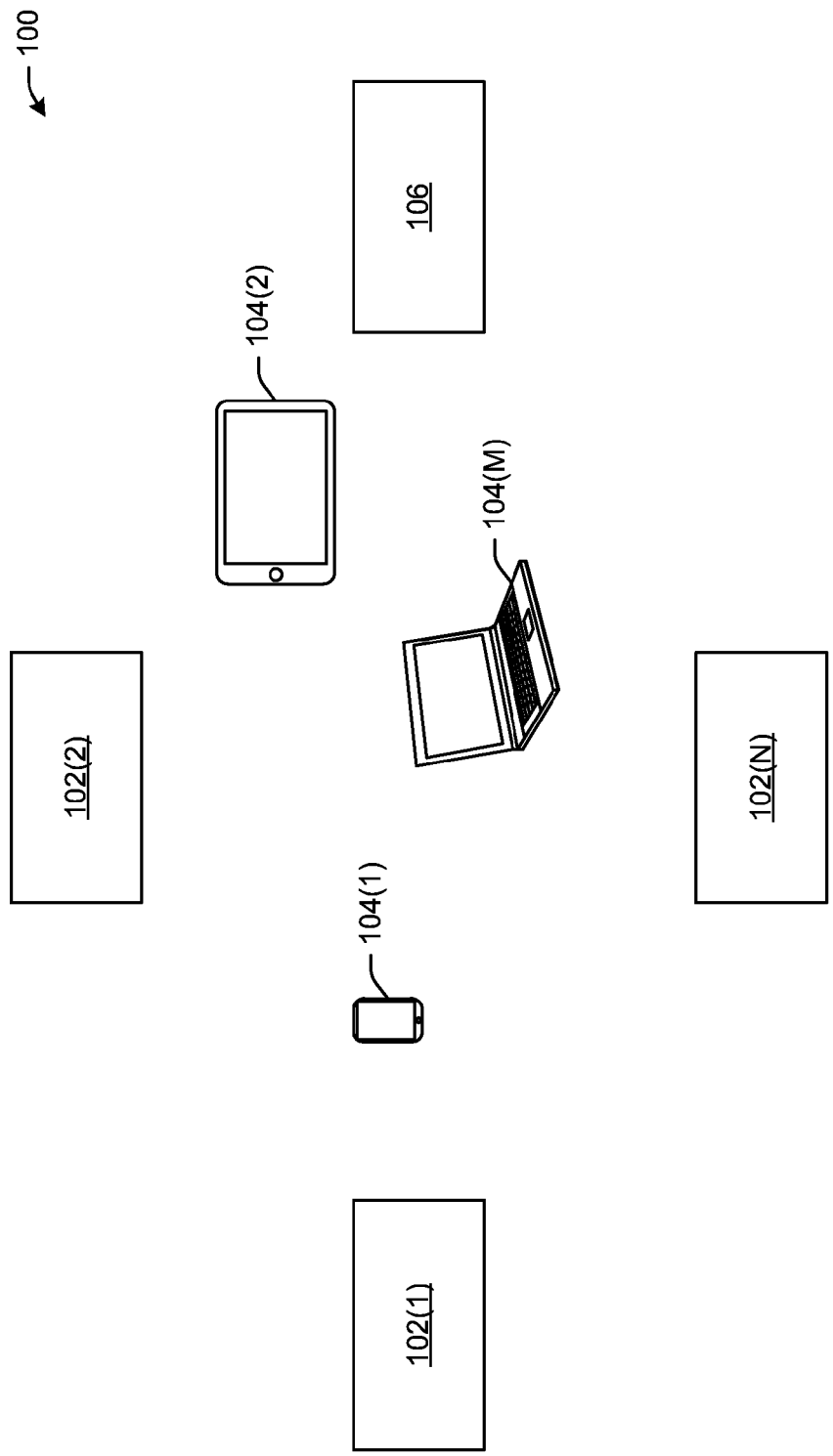
FIG. 1 is a schematic depiction of an embodiment of a location system.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments herein relate to, among other things, efficient location determination by wireless stations using one-to-many communication techniques. A wireless station can include but is not limited to, a computing device including a radio and antenna that facilitate wireless communications. The wireless stations can determine their locations, facilitated by other wireless stations, in a manner that places reduced demand on the other wireless stations. As used herein, an initiating wireless station refers to a wireless station that determines its location from other wireless stations a responding wireless station refers to the other wireless stations. In some embodiments, an initiating wireless station can determine its location based on the locations of the responding wireless stations using trilateration or multilateration techniques. For example, an initiating wireless station can determine its distance from three (e.g., trilateration) or more (e.g., multilateration) responding wireless stations and, using trilateration or multilateration techniques, can determine its location relative to the three or more responding wireless stations. In some embodiments, the responding wireless stations can facilitate distance determinations by the initiating wireless stations by implementing one-to-many communication techniques (e.g., groupcast techniques) to transmit timing messages to the initiating wireless stations. Using one-to-many communication techniques, a responding wireless station can reduce the demand on the responding wireless station's resources (e.g., reduce the amount of channel contention) for facilitating location determinations by the initiating wireless stations. For example, using one-to-many communication techniques, a responding wireless station can transmit one timing message that is received by a plurality of responding wireless stations, instead of transmitting a plurality of independent timing messages to the plurality of responding wireless stations (e.g., one timing message to each of the plurality of responding wireless stations). As described below, the timing messages transmitted from the responding wireless stations can facilitate an initiating wireless stations determination of its distance from the responding wireless station.

As used herein, the term "computing device" can refer to any computing component that includes one or more processors that can be configured to execute computer-readable, computer-implemented, or computer-executable instructions. Example devices can include access points, personal computers, server computers, server farms, digital assistants, smart phones, personal digital assistants, digital tablets, smart cards, wearable computing devices (e.g., watches, rings or computing devices integrated with clothing or other worn apparel), Internet appliances, application-specific circuits, microcontrollers, minicomputers, transceivers, kiosks, or other processor-based devices. Computing devices including a radio and antenna can wireless communicate between each other directly and/or through a network (e.g., network 402).

Location Determination System

FIG. 1 depicts an example environment 100 in which the location of an initiating wireless station may be determined according to techniques described herein. In certain embodiments, the example environment 100 includes one or more responding wireless stations 102(1)-102(N) and the one or more initiating wireless stations 104(1)-104(M), where N and M are integers and where N≥1 and M≥1. In some embodiments, the responding wireless stations 102(1)-102(N) can individually include wireless access points and the initiating wireless stations 104(1)-104(M) can independently include another type of computing device such as a smart phone, a mobile phone, a tablet computer, a laptop computer, a desktop computer, and/or a wearable computing device. In additional or alternative embodiments, the responding wireless stations 102(1)-102(N) can include Neighbor Awareness Network ("NAN") cluster sync or a WiFi Direct Group Owner ("WFD GO"). The example environment 100 can include an indoor facility, such as an airport terminal, office, a residence, a shopping mall, a university building, or other interior space that may include walls (not shown) and other items located within the interior space and the one or more access points 102(1)-102(N) and the one or more wireless devices 104(1)-104(M) can be contained within the indoor facility. In additional or alternative embodiments, the example environment 100 can include one or more buildings and the one or more access points 102(1)-102(N) and the one or more wireless communication devices 104(1)-104(M) can be distributed inside or outside of the buildings in any desirable configuration. The location of an initiating wireless station may be determined in such areas in certain embodiments herein. For clarity, as used herein, references to access points 102 and wireless devices 104 implicitly refers to the respective one or more access points 102(1)-102(N) and one or more wireless devices 104(1)-104(M), unless explicitly stated otherwise.

As shown in FIG. 1, the environment 100 can include, but is not limited to, the access points 102 and the initiating wireless stations 104. In some embodiments, it can be desirable for the initiating wireless stations 104 to use three or more of the responding wireless stations 102 to determine their respective locations. In some such embodiments, a wireless communications device 104 can independently use any three of the responding wireless stations 102 to determine its locations using trilateration. For example, the initiating wireless station 104 can measure its relative distance from any three of the responding wireless stations 102. The wireless communications device 104 can then determine, based at least in part on its relative distances from the three responding wireless stations 102, its relative location. In one example embodiment, the location of the wireless communications device 104 can be determined using trilateration, in which the initiating wireless station 104 can determine its location by identifying an overlapping region between three spheres each having an origin and a radius. For each sphere, the origin can be determined based at least in part on the location of one of the three responding wireless stations 102 and the radius can be determined based at least in part on the on the determined distance between the initiating wireless station 104 and the respective three responding wireless stations 102. In one such example, the three origins can be taken as the locations of the three responding wireless stations 102 and the three radii can be taken as the distances between the wireless communications device 104 and the respective three responding wireless stations 102. Points in the overlapping region between the three spheres can correspond to probable locations of the responding wireless station 102. In additional or alternative embodiments, wireless communications devices 104 can independently use any four or more of the responding wireless stations 102 to determine their respective, relative locations using multilateration (e.g., determining the overlapping region of four or more spheres).

The initiating wireless stations 104 can communicate with the responding wireless stations 102 to determine their respective distances from the responding wireless stations 102. In some embodiments, the initiating wireless stations 104 can measure their respective distances from initiating wireless stations 104 based at least in part on the time-of-flight of one or more timing messages transmitted to the initiating wireless stations 104 by the responding wireless stations 102 and/or one or more messages transmitted by the initiating wireless stations 104 to the responding wireless stations 102, as explained below. A timing message transmitted from a responding wireless station 102 to an initiating wireless station 104 can include an instruction to the initiating wireless station 104 to record the time the initiating wireless station 104 receives the timing message; a time that a previous message, transmitted by the initiating wireless station 104, was received by the responding wireless station 102; and/or acknowledgement indicating that a timing message previously transmitted by the initiating wireless station 104 was received by the responding wireless station 102. A timing message transmitted from an initiating wireless station 104 to a responding wireless station 102 can include an instruction to the initiating wireless station 104 to record the time the initiating wireless station 104 receives the timing message; a time that a pervious message, transmitted by the responding wireless station 102, was received the initiating wireless station 104; and/or an acknowledgement indicating that a timing message previously transmitted by the responding wireless station 102 was received by the initiating wireless station 104. For clarity, a timing message comprising an acknowledgement is referred to as an acknowledgement message. As described below, an initiating wireless station 104 can determine the time-of-flight of timing messages based at least in part on the contents of the timing messages.

As used herein, the time-of-flight of a timing message refers to the approximate difference between the time a timing message is sent by a responding wireless station 102 or an initiating wireless station 104 and the time the timing message is received by the respective initiating wireless station 104 and the responding wireless station 102. In some embodiments, an initiating wireless station 104 can determine its distance from a responding wireless station 102 using fine timing measurement ("FTM") techniques. In some such embodiments, as explained below, one or more timing messages are exchanged between the initiating wireless station 104 and the responding wireless station 102 and an initiating wireless station can determine the time-of-flight of at least one of the timing messages, as described below. Based at least in part on the time-of-flight of the one or more timing messages, the initiating wireless station 104 can determine its distance from the responding wireless station. The initiating wireless stations 104 can transmit and receive messages from the responding wireless stations 102 using a WiFi signal, a WiFi Direct signal, a Near Field Communication ("NFC") signal or via various other wireless communications protocols.

Figure 2:
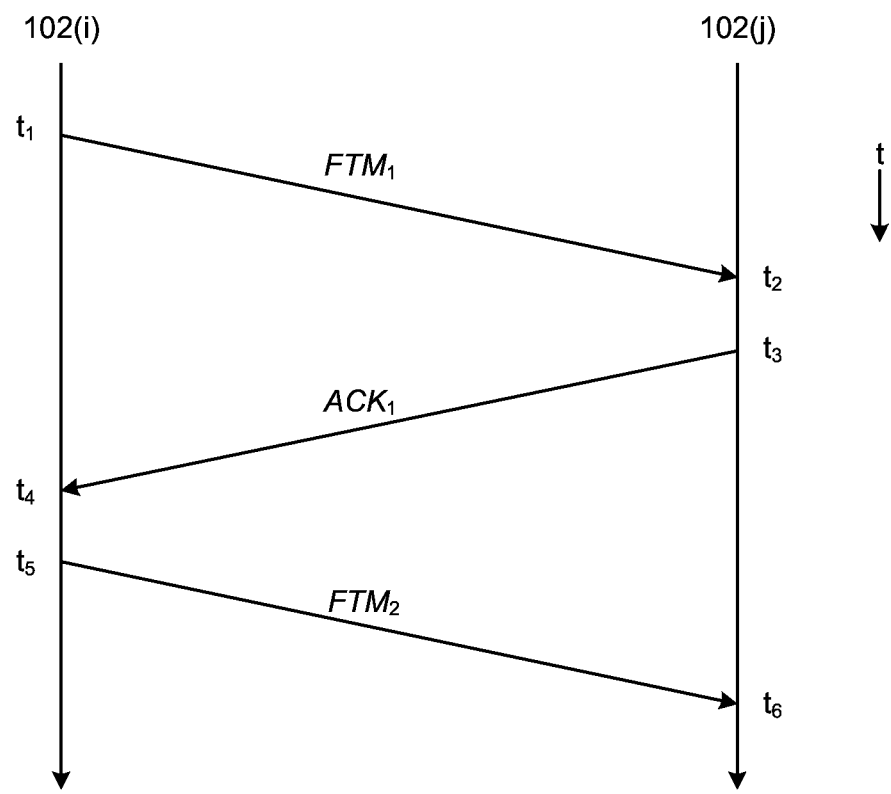
FIG. 2 is a schematic depiction of an example embodiment for determining the distance between an initiating wireless station and a responding wireless station.

FIG. 2 is a schematic representation of one example embodiment for determining the distance between a representative initiating wireless station 104(m) of the initiating wireless station 104 (m∈[1,M], where "[" and "]" are inclusive of the endpoints) and a representative responding wireless station 120(n) of the responding wireless stations 102 (n∈[1,N]). In FIG. 2, "t" denotes time. Referring to FIG. 2, at time $t_1$, the responding wireless station 102(i) sends a timing message, $FTM_1$, to the initiating wireless station 104(m) and the responding wireless station 102(n) stores the time $FTM_1$ was sent ($t_1$). $FTM_1$ can include an instruction to the initiating wireless station 104(m) to record the time it receives $FTM_1$. At time $t_2$, the initiating wireless station 104(n) receives $FTM_1$ and records the time it was received ($t_2$). At time $t_3$, the initiating wireless station 104(m) transmits an acknowledgement message, $ACK_1$, to the responding wireless station 102(n) and records the time it sent $ACK_1$ ($t_3$). In some embodiments, $ACK_1$ can include an indication to the responding wireless station 102(n) that $FTM_1$ was received by the initiating wireless station 104(m). At time $t_4$, the responding wireless station 102(n) receives $ACK_1$ and, responsive to receiving $ACK_1$, records the time it was received ($t_4$). At time $t_5$, the responding wireless station 102(n) transmits a timing message, $FTM_2$, including the recorded times $t_1$ and $t_4$ to the initiating wireless station 104(m), which is received at time $t_6$. The initiating wireless station 104(m) can then determine the distance to the responding wireless station 102(n) using the times $t_1$-$t_4$, wherein the time-of-flight of $FTM_1$ can be taken as $t_2$-$t_1$ and the time-of-flight of $ACK_1$ can be taken as $t_3$-$t_4$. In one example embodiment, the distance between the responding wireless station 102(n) and 104(m), R, can be given by:

$$R = c\frac{(t_4 - t_1) - (t_3 - t_2)}{2},$$

where c is the speed of light (about $3 \times 10^8$ m/s). While, for clarity, FTM and ACK are used herein to refer to transmissions by the responding wireless stations 102 and transmissions by the initiating wireless stations 104, respectively, a person of ordinary skill in the art will understand that both transmissions can be timing messages and the content of the transmissions FTM and ACK can be the same, similar or different.

While FIG. 2 shows one example embodiment of a distance determination, based upon the present disclosure, other methods can be implemented to determine the distance between the responding wireless stations 102 and the wireless communications devices 104 based upon the present disclosure. For example, in one embodiment, the initiating wireless stations 104 can determine their distances from the responding wireless stations 102 using one timing message. In such an example, a responding wireless station 102 can transmit a timing message to the initiating wireless station 104. The timing message can include the time the responding wireless station 102 sent the message and an instruction to the initiating wireless station to record the time the message was received. The initiating wireless station 104 can then determine its distance, R, from the responding wireless station 102 by: $R=c(t_2-t_1)$, where $t_1$ is the time that the timing message was sent and $t_2$ was the time the message was received. In some such embodiments, the time $t_1$ can be an estimate of the time the timing is message sent. For example, $t_1$ can be the time the process to send the timing message is scheduled with a scheduling daemon (not shown) associated with the responding wireless station 102.

Referring again to FIG. 1, the example environment can also include server 106. The responding wireless stations 102 and the initiating wireless stations 104 can be in communication with the server 106 through one or more wired or wireless networks (not shown). In some embodiments, the server 106 can communicate with the responding wireless station 102 and the initiating wireless stations 104 using a WiFi signal, a WiFi Direct signal, an NFC signal or via various other wireless communications protocols. In some embodiments, server 106 can include a storage including unique access point identifiers for the responding wireless stations 102 and respective positions of the responding wireless stations 102 logically associated with the respective identifiers. In some embodiments, the server 106 can communicate positions of the responding wireless stations 102 to the initiating wireless stations 104 to help the initiating wireless stations 104 determine their respective positions. For example, any given initiating wireless station of initiating wireless stations 104 can request, from the server 106, the location of a responding wireless station 102 that the initiating wireless station is determining its distance from. The initiating wireless station can determination its position based at least in part on the received location of the initiating wireless station as described above, for example, using trilateration or multilateration techniques.

In some embodiments, the responding wireless stations 102 can communicate with the initiating wireless stations 104 using specifically adapted one-to-many communications techniques. One-to-many communication techniques can be desirably adapted based on the present disclosure to more efficiently facilitate location determination by the initiating wireless stations 104. Using one-to-many communication techniques, a responding wireless station 102 can address a single message to a plurality of initiating wireless stations of the initiating wireless stations 104. For example, as explained below, the message can include an identifier associated with one or more initiating wireless stations 104 such that the one or more initiating wireless stations 104 process the message. A one-to-many communication technique can include, but is not limited to, a groupcast or multicast technique (e.g., such as those described in, for example, IEEE Std. 802.11™-2012, incorporated by reference herein), that are specifically adapted to facilitate location determination by the exchange of timing messages, as described herein. A groupcast technique can facilitate one-to-many communications over an IP infrastructure. For example, a groupcast message can include (e.g., be addressed to) one or more initiating wireless stations 104 using unique IP addresses assigned by the transmitting responding wireless station 102 to the one or more initiating wireless stations 104. For clarity, as used hereinafter, references to groupcast techniques will implicitly include references to groupcast techniques as well as other one-to-many communication techniques in accordance with the present disclosure, unless explicitly stated otherwise. Embodiments implementing groupcast techniques can be desirable because they can significantly reduce the demand for the transmission and/or reception resources (e.g., to reduce channel contention) of the responding wireless stations 102 in providing location determination services to the initiating wireless stations 104. For example, using traditional unicast communication techniques, a responding wireless station transmits distinct, individual messages to individual initiating wireless stations, where each message is addressed to the individual initiating wireless stations 104. Using a groupcast technique, a responding wireless station 102 can transmit a single message, addressed to one or more of the initiating wireless stations 104, to send the message to the one or more of the initiating wireless stations 104. The corresponding savings in overhead on the access point is exemplified in FIGS. 3(A)-3(D) (collectively, FIG. 3).

FIG. 3(A) is a schematic representation of one example embodiment for determining the distance between an initiating wireless stations $104(i)$, $104(j)$, and $104(k)$ of the initiating wireless station 104 (i,j,k∈[1,M]) and responding wireless stations $120(n)$ of the responding wireless stations 102 (n∈[1,N]) using a groupcast technique. Referring to FIG. 3(A), at time $t_1$, the responding wireless station $102(n)$ transmits, using a groupcast timing message, $FTM_1^{(i,j,k)}$, including an instruction to the initiating wireless stations $104(i)$, $104(j)$ and $104(k)$ to record the time the instruction is received by the respective initiating wireless stations ($t_1^{(i)}$, $t_2^{(j)}$, and $t_2^{(k)}$, respectively) and recording the time, $t_1$, the responding wireless station $102(n)$ transmitted the message. The initiating wireless stations $104(i)$, $104(j)$ and $104(k)$ transmit respective acknowledgement messages $ACK^{(i)}$, $ACK^{(j)}$ and $ACK^{(k)}$ back to the responding wireless station $102(n)$. The wireless access device $102(n)$, responsive to receiving the acknowledgement messages $ACK^{(i)}$, $ACK^{(j)}$ and $ACK^{(k)}$, records the times the acknowledgement messages are received, $t_4^{(i)}$, $T_4^{(j)}$, and $t_4^{(k)}$, respectively. The initiating wireless stations $104(i)$, $104(j)$ and $104(k)$ also record the times they transmitted the respective acknowledgement messages $ACK^{(i)}$, $ACK^{(j)}$ and $ACK^{(k)}$ ($t_3^{(i)}$, $t_3^{(j)}$, and $t_3^{(k)}$). At time $t_5$, the responding wireless station $102(n)$ transmits a groupcast timing message, $FTM_2^{(i,j,k)}$, including the times $t_1$, $t_4^{(i)}$, $t_4^{(j)}$, and $t_4^{(k)}$, to the initiating wireless stations $104(i)$, $104(j)$ and $104(k)$. The initiating wireless stations $104(i)$, $104(j)$ and $104(k)$ can then determine their respective distances from the responding wireless station $102(n)$ as described above and below. While FIG. 3A depicts $FTM_2^{(i,j,k)}$ as a groupcast timing message, in other embodiments, $FTM_2^{(i,j,k)}$ can be sent to the wireless communication devices $104(i)$, $104(j)$ and $104(k)$ as distinct timing messages $FTM_2^{(i)}$, $FTM_2^{(j)}$, and $FTM_2^{(k)}$.

FIGS. 3(B)-3(D) are schematic representations of the one example embodiment for determining the distance between the initiating wireless stations $104(i)$, $104(j)$, and $104(k)$ and the responding wireless station $102(n)$ using a unicast technique. Referring to FIGS. 3(B)-3(D), responding wireless station $102(n)$ sends three individual timing messages, $FTM_1^{(i)}$, $FTM_1^{(j)}$ and $FTM_1^{(k)}$, to the respective wireless communications devices $104(i)$, $104(j)$ and $104(k)$ at distinct respective times $t_1^{(i)}$, $t_1^{(j)}$ and $t_1^{(k)}$. $FTM_1^{(i)}$, $FTM_1^{(j)}$ and $FTM_1^{(k)}$ can instructions to the respective initiating wireless stations $104(i)$, $104(j)$ and $104(k)$ to record the respective times $FTM_1^{(i)}$, $FTM_1^{(j)}$ and $FTM_1^{(k)}$ are received ($t_2^{(i)}$, $t_2^{(j)}$, and $t_2^{(k)}$, respectively). At times $t_3^{(i)}$, $t_3^{(j)}$, and $t_3^{(k)}$, the respective initiating wireless stations $104(i)$, $104(j)$ and $104(k)$ transmit respective acknowledgement messages $ACK^{(i)}$, $ACK^{(j)}$, and $ACK^{(k)}$ to the responding wireless station $102(n)$, which are received at respective times $t_4^{(i)}$, $t_4^{(j)}$ and $t_4^{(k)}$. Responsive to receiving $ACK^{(i)}$, $ACK^{(j)}$, and $ACK^{(k)}$, the responding wireless station $102(n)$ records the respective times $t_4^{(i)}$, $t_4^{(j)}$ and $t_4^{(k)}$ respective $ACK^{(i)}$, $ACK^{(j)}$, and $ACK^{(k)}$ are received. At times $t_5^{(i)}$, $t_5^{(j)}$ and $t_5^{(k)}$ the responding wireless station $102(n)$ transmits three individual timing messages, $FTM_2^{(i)}$, $FTM_2^{(j)}$ and $FTM_2^{(k)}$, to the respective initiating wireless stations $104(i)$, $104(j)$ and $104(k)$. The timing messages $FTM_2^{(i)}$, $FTM_2^{(j)}$ and $FTM_2^{(k)}$ can respectively include times $t_4^{(i)}$ and $t_1^{(i)}$; times $t_4^{(j)}$ and $t_1^{(j)}$; and times $t_4^{(k)}$ and $t_4^{(k)}$, and from these times, the initiating wireless stations $104(i)$, $104(j)$ and $104(k)$ can compute their distances from the responding wireless station $102(n)$.

Figure 3:
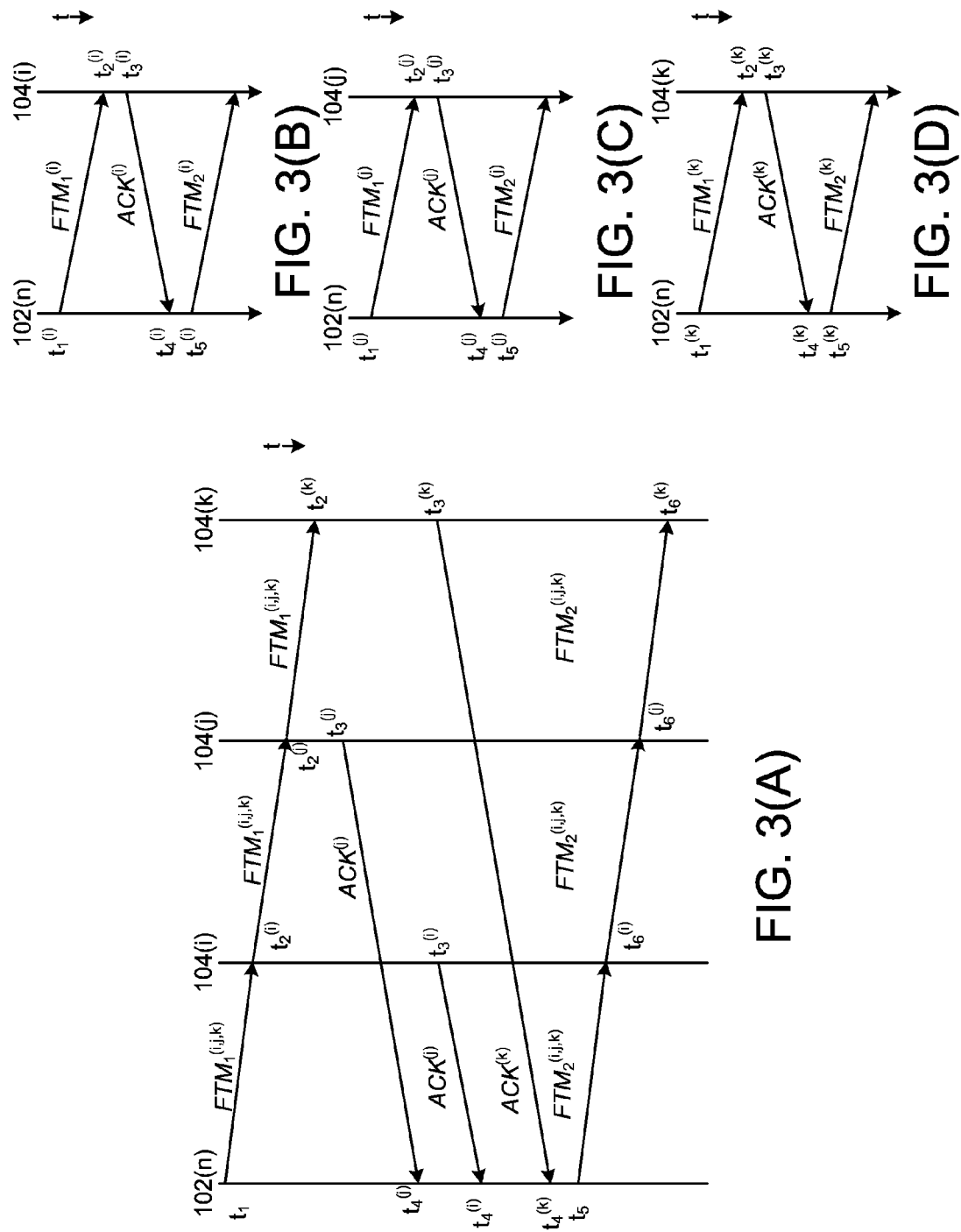
FIG. 3(A) is a schematic depiction of one example embodiment for determining the distance between a plurality of initiating wireless stations and a responding wireless station using groupcast communication techniques.
FIG. 3(B) is a schematic depiction of one example embodiment for determining the distance between a first initiating wireless station and a responding wireless station using unicast communication techniques.
FIG. 3(C) is a schematic depiction of one example embodiment for determining the distance between a second initiating wireless station and a responding wireless station using unicast communication techniques.
FIG. 3(D) is a schematic depiction of one example embodiment for determining the distance between a third initiating wireless station and a responding wireless station using unicast communication techniques.

Comparing FIG. 3(A) with FIGS. 3(B)-3(D), using groupcast communication techniques, the initiating wireless stations $104(i)$, $104(j)$, and $104(k)$ determine their locations based at least in part on six communication signals by the responding wireless station $102(n)$, according to the embodiments depicted in FIG. 3. In general, in such embodiments, the relative difference in the number of communication signals generated by a responding wireless station 102 for a location determination by the initiating wireless stations 104 can be taken as:

$$\frac{N_G(N_{WCD}-1)}{N_T N_{WCD}},$$

where $N_T$ is the number of transmissions from a responding wireless station to an initiating wireless station in a unicast communication embodiment, for a single distance determination, $N_{WCD}$ is the number of initiating wireless stations determining their distances from the responding wireless station, and $N_G$ is the number of transmissions of $N_T$ that are replaced with groupcast transmission to implement a groupcast embodiment. For example, in embodiments in the embodiments schematically depicted in FIG. 3 ($N_T=2$, $N_G=2$ and $N_{WCD}=3$) the relative difference in the number of communication signals generated by the responding wireless station $102(n)$ using groupcast transmission can be about 83%. If, on the other hand the number of initiating wireless stations were $N_{WCD}=100$, the relative difference in the number of communication signals generated by the responding wireless station $102(n)$ using groupcast communications can be about 99%. In embodiments where only some of the timing messages transmitted by the responding wireless station $102(n)$ are transmitted using groupcast communications, the relative savings in the number of transmissions can still be significant. For example, referring to FIG. 3, in embodiments in which $FTM_2^{(i,j,k)}$ is sent to the initiating wireless stations $104(i)$, $104(j)$ and $104(k)$ as distinct timing messages $FTM_2^{(i)}$, $FTM_2^{(j)}$, and $FTM_2^{(k)}$ ($N_G=1$), as described above, the relative difference in the number of communication signals transmitted by the responding wireless station $102(n)$ can still be about 33% (with $N_{WCD}=3$) and about 50% (with $N_{WCD}=100$).

In some embodiments, implementing specifically adapted groupcast communication techniques, a responding wireless station 102 can address messages to specific initiating wireless stations 104. In one such embodiment, the initiating wireless stations 104 can send requests to the responding wireless station 102 to request an FTM session, as explained in detail below. An FTM session can include one or more time periods over which a responding wireless station 102 will exchange timing messages with the initiating wireless stations 104 to facilitate the initiating wireless stations 104 respective distances from the responding wireless station 102, also as explained in detail below. In some embodiments, the responding wireless station 102 can optionally respond to an FTM session request from an initiating wireless station 104 with an acknowledgement message including an assigned unique identifier for the respective initiating wireless stations 104 requesting an FTM session and acknowledging acceptance of the FTM sessions request. The unique identifier can be an identifier that uniquely identifies the initiating wireless station 104 to the responding wireless station 102, relative to all of the other responding wireless stations 102. The identifier can include any length string of alphabetical characters, numeric characters or alphanumeric characters. When transmitting a timing message using a groupcast protocol, the responding wireless station 102 can include the unique identifiers (relative to the responding wireless station) in the timing message header information. The initiating wireless stations 104 that requested an FTM session can then interrogate the transmitted groupcast timing message and compare the assigned unique identifier with the unique identifiers included in the timing message header information. For any given initiating wireless stations 104 that requested an FTM session, if the message includes the unique identifier that was assigned to the initiating wireless station, the initiating wireless station can continue to process the message and, if not, it can ignore the rest of the message. In such embodiments, the initiating wireless station can include, or otherwise have access to, a list of available identifiers (e.g., identifiers that are not assigned and currently being used to transmit groupcast messages) and can identify from the list identifiers that can be assigned to wireless communications devices of the initiating wireless stations 104 requesting an FTM session. In some embodiments, the unique identifier can be allocated to the initiating wireless stations 104 by the responding wireless station 102 prior to the transmission of an FTM session request, for example, during a handshaking procedure between responding wireless station 102 and the initiating wireless stations.

In some embodiments, the acknowledgement message can also include a number of times the responding wireless station 102 will facilitate a distance determination (e.g., a single distance determination) during an FTM session. For example, if the initiating wireless stations 104 determine their respective distances from the responding wireless station 102 based at least in part on N≥1 groupcast timing messages transmitted by the responding wireless station 102, each time the responding wireless station 102 transmits the N≥1 groupcast timing messages to the initiating wireless station 104, the responding wireless station 102 facilitate a distance determination. The number of times the responding wireless station 102 will facilitate a distance determination can be preselected. For example, as explained below, an administrator of the responding wireless station 102 to configure the responding wireless station 102 to set the number of time the responding wireless station 102 will facilitate a distance determination during an FTM session.

Various techniques can be used to select which access points of the access points 102 can be used by an initiating wireless station 104 in determining its location. Such techniques can include selecting a preselected number (e.g., three, four, five or more) of the access points 102 based at least in part on measurements of received signal strength indicators ("RSSIs"). An RSSI can be a measurement of the power level of a signal received by an antenna of an initiating wireless station 104. In some such embodiments, the initiating wireless station can measure the RSSI from signals transmitted from at least some of the responding wireless stations 102 and select a certain number of the responding wireless stations 102 corresponding to the highest power (power). For example, a higher RSSI can indicate a higher power and an initiating wireless station can measure the RRSI from some or all of the responding wireless stations 102. The initiating wireless station can then select a preselected number of responding wireless stations 102 corresponding to the highest (as a group) RSSIs. In additional or alternative embodiments, as described in detail below, the initiating wireless stations 104 can receive the locations of the responding wireless stations 102 from the server device 106. In some such embodiments, the wireless communications devices 104 can select any three or more responding wireless stations 102 having linearly independent locations. In additional embodiments, the selected access points having linearly independent locations can also correspond to the access points having (as a group) the highest power, for example, as measured by the RSSI.

Figure 4:
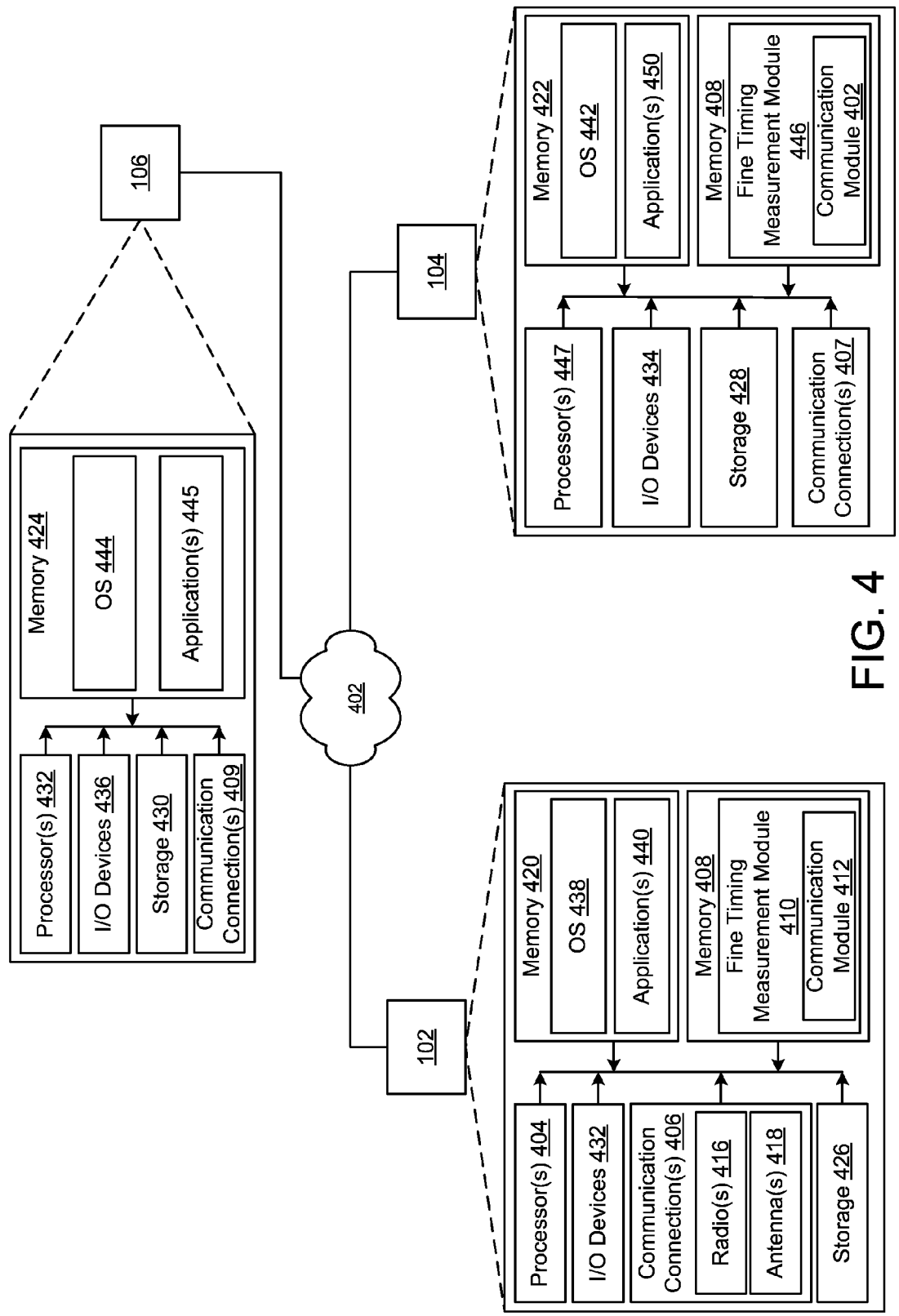
FIG. 4 is a schematic depiction of example, embodiments of some of the components of the location system depicted in FIG. 1.

FIG. 4 is a schematic depiction of example embodiments of some of the components of the location system depicted in FIG. 1. As described above, the initiating wireless stations 104 can communicate with the responding wireless stations 102 and the server device 106 over one or more networks 402 to facilitate determining a location of the initiating wireless station 104 as described herein.

As used herein, the term "device" can refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, smart cards, wearable computing devices, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate the processes described herein. In some embodiments, the responding wireless stations 102 can include a computing device that allows the initiating wireless stations 104 to connect to the wired or wireless network 402 through the responding wireless stations 102. In some such examples, the responding wireless stations 102 can include, but is not limited to, routers or wireless range extenders.

The responding wireless stations 102 can include one or more processors 404 configured to communicate with one or more memory devices and various other components or devices of the responding wireless stations 102. For example, the responding wireless stations 102 can include the one or more processors 404 and one or more communication connections 406 and memory 408. The processors 404, communication connections 406 and memory 408 can be implemented as appropriate in hardware, software, firmware or any combination thereof. According to one configuration, the processors 404 can execute instructions associated with software in the memory 408 including, but not limited to, the fine timing measure module 410 and communications module 412.

The communication connections 406 can allow the responding wireless stations 102 to communicate with other devices via the one or more wireless and/or wired networks 402. In some embodiments, the communication connections 406 can include one or more wireless signal detectors (not shown). The wireless signal detectors can include a wireless system that configures the responding wireless stations 102 to send and/or receive various types of wireless signals from other devices, such as the initiating wireless station 104, as described above. Such a wireless system can include one or more radios 416 and one or more antennas 418, which can include hardware and software for sending and/or receiving wireless signals over various types of wireless networks. Such networks may include, but are not limited to, NFC, WiFi, WiFi Direct, Bluetooth, RFID, ultra-wide band ("UWB"), Zigbee, other protocols, etc. The communications connections 406 can also include various modulation techniques for modulating signals. Such signals may include information in frames distributed over the one or more networks 402, such as Orthogonal Frequency Division Multiplexing (OFDM), dense wave division multiplexing (DWDM), phase-shift keying (PSK), frequency-shift keying (FSK), amplitude-shift keying (ASK), and quadrature amplitude modulation (QAM), among other techniques. Each of the access points and devices shown in FIGS. 1 and 4 can utilize such modulation techniques, as well as demodulation techniques, to access information from a modulated signal. The communications connections 407 and 409 associated with the respective initiating wireless stations 104 and the server device 106 can be the same or similar to the communication connections 406, in one embodiment.

The radios 416 can include any suitable radio and/or transceiver (transmitter and receiver) for transmitting and/or receiving radio frequency (RF) signals in the bandwidth and/or channels corresponding to the communications protocols utilized by the responding wireless stations 102 to communicate with the initiating wireless station 104, the servicer device 106 and/or other wireless network devices (not shown). The radios 416 can include hardware and/or software to modulate and/or demodulate communications signals according to pre-established transmission protocols. The radios 416 can further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radios 416, in cooperation with the antennas 418, can be configured to communicate via 2.4 GHz channels (e.g., 802.11b, 802.11g, 802.11n), 5 GHz channels (e.g., 802.11n, 802.11ac), or 60 GHZ channels (e.g., 802.11ad). In alternative example embodiments, non-Wi-Fi protocols may be used for communications between the responding wireless stations 102 and the initiating wireless stations 104, such as Bluetooth, dedicated short-range communication ("DSRC"), or other packetized radio communications. The radios 416 can include any known receiver and baseband suitable for communicating via the communications protocols of the initiating wireless stations 104. The radios 416 can further include a low noise amplifier ("LNA"), additional signal amplifiers, an analog-to-digital ("A/D") converter, one or more buffers, and digital baseband.

The communication connections 406 can be in communication with the fine timing measurement ("FTM") module 410, through the communication module 412, to send wireless groupcast communications to, and to receive wireless communications from, the initiating wireless stations 104. In some embodiments, the FTM module 410 can be configured to accept FTM session requests from the initiating wireless stations 104. In some embodiments, during an FTM session, timing messages are exchanged between the FTM module 410 and the initiating wireless stations 104. Acceptance of an FTM session can include receipt, by the FTM module 410, of a request message from an initiating wireless station 104 to initiate timing message exchange with the initiating wireless stations 104. The request message can include a request for the responding wireless stations 102's availability to participate in timing message exchanges. In some embodiments, the FTM module 410 can receive the request message from the initiating wireless stations 104 via the communication connections 406 and via the communication module 412. The FTM module 410 can process the FTM request messages and transmit communications, via the communication connections 406, to the initiating wireless stations 104, acknowledging that the requests were received by the responding wireless station 102. In some embodiments, the acknowledgement message can also include an indication of the responding wireless station 102's temporal availability to exchange timing messages with the initiating wireless station 104 (e.g., times at which the responding wireless station 102 will not be dedicated to other processes that would prevent the exchange of timing messages, based upon available resources (e.g., channel contention)). For example, the FTM module 410 can transmit acknowledgement messages including one or more time windows (e.g., burst instances), including a start time and a time duration, over which the FTM module 410 will exchange timing messages with the initiating wireless stations 104. For example, the time windows can be an allocation by the FTM module 410 of one or more time windows to the initiating wireless stations 104 over which the initiating wireless stations 104 are to be accessible for exchange of timing messages. in some embodiments, the acknowledgement messages can further include one or more burst periods (e.g., the time interval from the beginning of one burst instance to the beginning of the following burst instance) as well as burst time out (e.g., the duration of each burst instance starting at the boundary of a burst period).

In some embodiments, as described above, the acknowledgement message can also include a unique identifier to facilitate timing message exchange using a specifically adapted groupcast communications technique. The unique identifiers can include an alphabetical, numerical or alphanumeric sequence of characters of any length. The unique identifiers can uniquely identify the wireless communications devices 104, relative to a given responding wireless station 102. In some embodiments, an initiating wireless station 104 can determine, based at least in part on the unique identifier, if a groupcast message sent from a responding wireless station 102 includes information transmitted by the responding wireless station 102 to the initiating wireless station, as described below. The unique identifiers can be assigned to the initiating wireless stations 104 in response to the FTM module 410 receiving a respective request to initiate an FTM session using groupcast communications, as explained above. The memory 408, in addition or alternatively to, any other memory accessible to the FTM module 410 (e.g., the memory 420 and/or the storage 426) can include a list of unique identifiers and, logically associated therewith, an indication of whether the respective unique identifier is currently allocated by the responding wireless station 102 to facilitate any groupcast communications. If an initiating wireless station 104 requests an FTM session, the FTM module 410 can access memory 408 (and/or any other memory accessible to FTM module 410, for example, the memory 420 and/or the storage 426)) to determine whether to assign a non-allocated unique identifier to the initiating wireless station or whether the initiating wireless station has already been assigned a unique identifier by the responding wireless station 102, as described in further detail below.

The FTM module 410 can also be configured to exchange timing messages with the initiating wireless stations 104, as explained above. Exchange of timing messages can include transmission of timing messages by the FTM module 410, in conjunction with the communication module 412 and the communications connections 406, to the wireless communications devices 104. The FTM module 410 can transmit one or more timing messages and one or more of the transmitted messages can be transmitted using a groupcast communication technique. As explained above, to facilitate groupcast communication techniques, a timing message can include one or more unique identifiers allocated by the FTM module 410 to the wireless communications devices 104 that have requested an FTM session. For example, referring to the exemplary embodiment depicted in FIG. 3(A), if the initiating wireless stations 104(i), 104(j) and 104(k) requested an FTM session from the responding wireless station 102(n), the timing message $FTM^{(1)}$ can include unique identifiers allocated to the initiating wireless stations 104(i), 104(j) and 104(k). Accordingly, the initiating wireless stations 104(i), 104(j) and 104(k) can process $FTM^{(1)}$ to identify the unique identifiers therein, determine the unique identifiers correspond to identifiers allocated to the initiating wireless stations 104(i), 104(j) and 104(k) and can continue to process $FTM^{(1)}$. The initiating wireless stations 104(1) (1≠i, 1≠j, and 1≠k) similarly can initially process $FTM^{(1)}$ to identify the unique identifiers therein. The initiating wireless stations 104(1) can determine that none of the unique identifiers correspond to a unique identifier allocated to them in response to an FTM session request sent to the responding wireless station 102(n) and can forgo further processing of $FTM^{(1)}$. In some embodiments including a plurality of responding wireless stations 102, groupcast messages transmitted by the responding wireless stations 102 can further include a service set identification ("SSID") uniquely identifying the responding wireless stations 102 to the initiating wireless stations 104. In embodiments, an initiating wireless station 104 can determine, based at least in part on the unique identifier and the SSID, if a groupcast message sent from a responding wireless station 102 includes information transmitted by the responding wireless station 102 to the initiating wireless station 104.

Returning to FIG. 4, the timing messages transmitted from FTM module 410 to the initiating wireless stations 104 can include an instruction to the initiating wireless stations 104 to record the time the transmitted message is received, as explained above in reference to FIG. 3(A). In some embodiments, the FTM module 410 can also record the time it transmitted a timing message to the initiating wireless stations 104 and/or received timing messages from the initiating wireless stations 104. The transmission and/or reception times can be stored in memory 408 or any other suitable memory accessible to the FTM module 410 (e.g., the memory 420 and/or the storage 426). In some embodiments, the transmission and/or reception times can be transmitted to the wireless communications devices 104 using a groupcast protocol to facilitate their determination of their respective distances from the responding wireless station 102, for example, as described above with respect to FIG. 3(A). In some such embodiments, a reception time can be logically associated with the unique identifier corresponding to the initiating wireless station 102 that sent timing message. An initiating wireless station 102 can determine, based at least in part on the logically associated unique identifier, the times corresponding to the reception of timing messages transmitted to the responding wireless station 102 from the initiating wireless station. For example, returning to the example embodiment schematically depicted in FIG. 3(A), the timing message $FTM^{(2)}$ can include the time $t_1$ when the responding wireless station 102(n) transmitted the timing message $FTM^{(1)}$ and the times $t_4$, $t_6$ and $t_8$, that the responding wireless station 102(n) received the respective timing messages $ACK_2$, $ACK_1$ and $ACK_3$ from the respective initiating wireless stations 104(j), 104(i) and 104(k). The timing message $FTM^{(2)}$ can include the unique identifiers $ID_i$, $ID_j$ and $ID_k$, allocated to the respective initiating wireless stations 104(i), 104(j) and 104(k), logically associated with the respective times $t_6$, $t_4$ and $t_8$. Upon receipt of the timing message $FTM^{(2)}$ by the initiating wireless stations 104(i), 104(j) and 104(k), the initiating wireless stations 104(i), 104(j) and 104(k) can identify the respective times $t_6$, $t_4$ and $t_8$, as the times the responding wireless station 102(n) received respective timing messages $ACK_1$, $ACK_2$, and $ACK_3$ from the respective initiating wireless stations 104(i), 104(j) and 104(k).

Returning to FIG. 4, exchange of timing messages can also include reception of timing messages by the FTM module 410, in conjunction with the communication module 412 and the communications connections 406, from the wireless communications devices 104. In some embodiments, timing messages received from the wireless communications devices 104 can include instructions to the FTM module 410 to record the time the timing message was received. In other embodiments, the instruction to record the time can be implicit. For example, in some such embodiments, after receiving an FTM session request from an initiating wireless station 104, the responding wireless station 102 can transmit a timing message (e.g., $FTM_1^{(i,j,k)}$) to the initiating wireless station 104, as described above. In response, the initiating wireless station 104 can transmit an acknowledgement message (e.g., $ACK_1^{(i)}$) to the responding wireless station 102, also as described above. Based at least in part on the fact that the acknowledgement message is the first message received by the responding wireless station 102, from the initiating wireless station 104, in response to the transmitted timing message, the responding wireless station 102 can interpret the acknowledgement message as an instruction to record the time the acknowledgement message is received. Upon receipt of the timing messages, including acknowledgement messages, from the initiating wireless stations 104, the FTM module 410 can store the reception times in the memory 408 or any other suitable memory accessible to the FTM module 410 (e.g., the memory 420 and/or the storage 426), as described above. In some embodiments, to facilitate the transmission of subsequent timing messages to the initiating wireless stations 104 using a specifically adapted groupcast protocol, the FTM module 410 can store the reception times and, logically associated therewith, the allocated unique identifiers corresponding to the initiating wireless stations 104 that sent the respective timing messages. In such embodiments, the FTM module 410 can send a timing message including the reception times to the initiating wireless stations 104 using a specifically adapted groupcast protocol, as explained above.

In some embodiments, the FTM module 410 can be configured to receive an availability messages from the initiating wireless stations 104. In one such embodiment, after receiving an FTM session request and prior to transmitting any timing messages to the initiating wireless stations 104, the FTM module 410 can receive one or more availability messages from the initiating wireless stations 104. An availability message from the initiating wireless stations 104 can include, but is not limited to, one or more trigger frames. In some embodiments, a trigger frame can be transmitted within at least one of the time periods (e.g., burst instances) allocated by the responding wireless station 102. A trigger frame can include an indication that the initiating wireless station 104 is available to exchange timing messages from the point in time that the trigger frame is transmitted from the initiating wireless station 104 to the end of the time period in which it is transmitted. A trigger frame can be transmitted by the initiating wireless station 104 based at least in part on when the initiating wireless station 104 determines that it has resources available to exchange timing messages with the responding wireless station 104 (e.g., when the initiating wireless station estimates that it will have available resources (no channel contention) to exchange timing messages with the responding wireless station 104). For example, the initiating wireless stations 104 can transmit availability messages during one or more burst periods (e.g., at the beginning of each burst period) to the wireless access points 102. At the beginning of each burst period, the FTM module 410 can wait a preselected amount of time to receive availability messages from the initiating wireless stations 104 that requested timing measurement exchanges. The FTM module 410 can determine, based at least in part on the availability messages received from the initiating wireless stations 104 during the preselected wait time, the times during the burst period that most of the initiating wireless stations 104 are available to receive timing messages, and the FTM module 410 can transmit timing messages, receive timing messages or both during those times.

Networks 402 can facilitate communication between the responding wireless station 102, the initiating wireless stations 104 and the servicer device 106. Networks 402 can include any number of wireless networks that can enable various devices in the example system 100 to communicate with one another. In some embodiments, other networks, intranets, or combinations of different types of networks may be used including, but not limited to, WiFi networks, WiFi Direct networks, NFC networks, Bluetooth® networks, cellular networks, radio networks, satellite networks, other short-range, mid-range, or long-range wireless networks, the Internet, intranets, cable networks, landline-based networks, or other communication mediums connecting multiple computing devices to one another.

The memories 408 and 420 can store program instructions that are loadable and executable on the processors 404, as well as data generated during the execution of these programs. Depending on the configuration and type of the responding wireless stations 102, the memories 408 and 420 can be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. The memories 422, 423 and 424 associated with the respective access points 102 and the server device 106 may be the same or at least similar to the memories 408 and 420, in one embodiment.

The storage 426 associated with the responding wireless stations 102 can include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing system. The storage 428 and 430 associated with the respective responding wireless stations 102 and the server device 106 can be the same or at least similar to the storage 426, in one embodiment.

The memories 408, 420, 422, 423 and 424, and the storages 426, 428 and 430, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The input/output ("I/O") devices 432 associated with the responding wireless stations 102 can enable a user to interact with the responding wireless stations 102 to perform various functions (e.g., the functions described herein). The I/O devices 432 can include, but are not limited to, a keyboard, a mouse, a pen, a voice input device, a touch input device, a gesture detection or capture device, a display, a camera or an imaging device, speakers, and/or a printer. The I/O devices 434 and 436 associated with the respective responding wireless stations 102 and the server device 106 can be the same or at least similar to the I/O devices 432, in one embodiment.

Turning to the contents of the memory 420, the memory 420 can include, but is not limited to, an operating system ("O/S") 438 and one or more user applications 440. Each of these modules 438 and 440 can be implemented as individual modules that provide specific functionality to facilitate location determination by the initiating wireless stations 104 using multicast communication techniques. Alternatively, one or more of the modules 438 and 440 can perform all or at least some of the functionality associated with the other modules.

The operating system 438 can refer to a collection of software that manages computer hardware resources and provides common services for computer programs to enable and facilitate operation of such programs. Example operating systems can include, but are not limited to, UNIX, LINUX, Microsoft Windows, Google Android, Apple OS X and Apple iOS. The operating system 442, associated with the initiating wireless stations 104, and the operating system 444, associated with the server device 106, can be the same or similar to the operating system 438, in one embodiment.

The user applications 440 can perform any number of functions, including enabling a user to view and/or interact with content (e.g., text, data, video, multimedia, or other information). In some embodiments, a user application of the user applications 440 can be accessed through the networks 402 (or other wired and/or wireless networks, not shown) by the initiating wireless stations 104 and/or other computing devices to configure the performance of the responding wireless station 102. For example, a user and/or system administrator can access the user applications 440 from a computing device to configure the performance the responding wireless stations 102. In some embodiments, a user application of the user application 440 can configure the responding wireless stations 102 to allow no more than a preselected number of the initiating wireless stations 104 to participate in any given FTM session with the responding wireless stations 102. As explained above, in some embodiments, a user application 440 can configure a responding wireless station 102 to set the number of times the responding wireless station 102 will facilitate a distance determination during an FTM session.

The initiating wireless stations 104 can include one or more processors 447 configured to communicate with one or more memory devices and various other components or devices of the initiating wireless stations 104. For example, the initiating wireless stations 104 can include the processors 446 and one or more communication connections 407 (including radios and antennas (not shown) as describe above) and memory 423. The processors 447, communication connections 407 and memory 423 can be implemented as appropriate in hardware, software, firmware or any combination thereof. According to one configuration, the processors 447 can execute instructions associated with software in the memory 423 including, but not limited to, the fine timing measure module 446 and communications module 448.

The communication connections 406 can be in communication with the FTM module 446, through the communication module 448, to send wireless communications to, and to receive wireless communications from, the responding wireless stations 102. As described above, groupcast communications from the responding wireless stations 102 can include unique identifiers, allocated by the responding wireless stations 102 to the initiating wireless stations 104 to uniquely identify the initiating wireless stations 104 to the respective responding wireless stations 102. In some embodiments, the unique identifiers can be allocated and transmitted to the initiating wireless stations 104 from the responding wireless stations 102 in response to FTM session requests transmitted to the responding wireless stations 102. The received unique identifiers can be stored in memory 423 or any other suitable memory accessible to the FTM module 446 (e.g., memory 422 or storage 428). The stored unique identifiers can be accessed by the FTM module 410 in processing specifically adapted groupcast communication messages sent from the responding wireless stations 102, as described above.

In some embodiments, the FTM module 446 can be configured to transmit FTM session requests to the responding wireless stations 102, as described above. Also, as described above, the FTM module 446 can be configured to receive an acknowledgement message from the initiating wireless stations 104 indicating the initiating wireless stations 104 temporal availabilities to exchange timing messages with the initiating wireless stations 104. In some embodiments, responsive to receiving the temporal availabilities from the responding wireless stations, the FTM module 446 can schedule resource availability of the initiating wireless station 104 to permit transmission and reception of timing messages during the received availabilities from one or more of the responding wireless stations 102. For example, an initiating wireless station 104 can receive availability messages from, for example, 5 of the responding wireless stations 102. The availability messages can include independent time windows that the 5 individual responding wireless stations 102 will be available for timing message exchange. The initiating wireless station 104 can schedule and/or reserve availability of its resources to permit exchange of timing messages between the initiating wireless station 104 and one, some or all of the 5 responding wireless stations 102 (e.g., when it estimates that there will be no channel contention). In some embodiments, the responding wireless stations 102 can reserve resources (e.g., reserve channel bandwidth availability) during selected time windows for timing message exchange through a scheduling daemon (not shown) associated with the responding wireless stations 102.

The FTM module 446 can also be configured to exchange timing messages with the initiating wireless stations 104, as explained above. Exchange of timing messages can include transmission of timing messages by the FTM module 446, in conjunction with the communication module 448 and the communications connections 407, to the responding wireless stations 102. In some embodiments, the FTM module 446 can record times that it transmits messages to a responding wireless station 102 and/or record times that it receives messages from the responding wireless station. For example, as explained above, the FTM module 446 can record a time that it transmits a timing message to the responding wireless station. As another example, the FTM module 446 can record a time that it receives a timing message from the responding wireless station, responsive to an instruction in the timing message for the initiating wireless station 104 (e.g., the FTM module 446, thereof) to record the time the message is received. The transmission and reception times can be stored in the memory 423 or any other suitable memory accessible to the initiating wireless station 104 (e.g., the memory 422 or storage 428). As described above and below, the initiating wireless station 104 can access the stored transmission and/or reception times and, based at least in part thereon, the initiating wireless station 104 can determine its distance from the responding wireless station.

Figure 5:
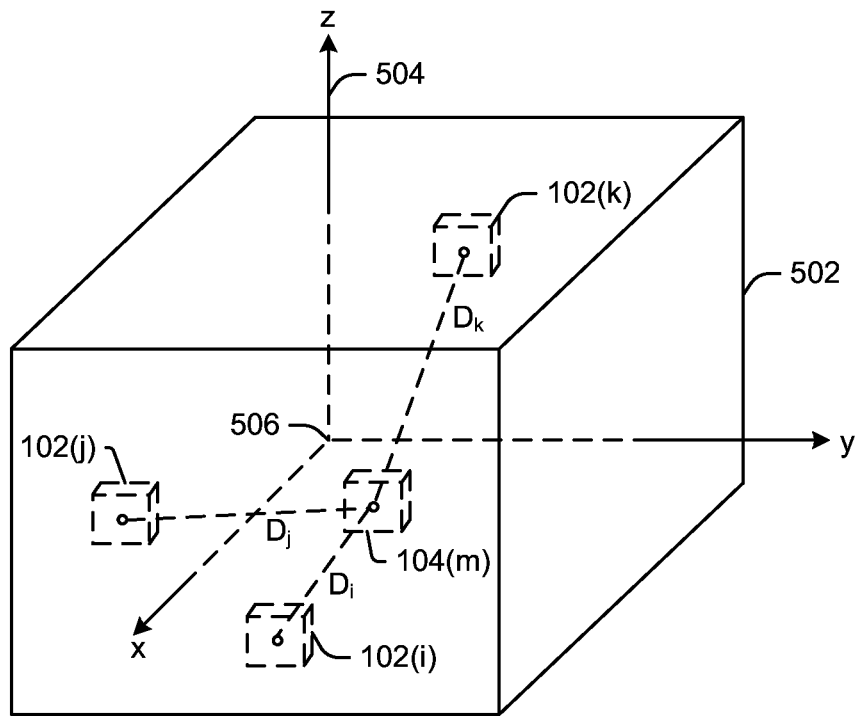
FIG. 5 is a schematic depiction of an example embodiment of a location determination by an initiating wireless station using trilateration.

As described above, an initiating wireless station 104 can determine, based at least in part on its distance from a plurality of the responding wireless stations 102, its relative location. For example, also as described above, the initiating wireless station 104 can determine, based at least in part on its distance from a plurality of the responding wireless stations 102 and the relative locations of the plurality of the responding wireless stations 104, its relative location using known trilateration or multilateration techniques described herein. FIG. 5 is a schematic depiction of an example embodiment of a location determination by an initiating wireless station 104 using trilateration. Referring to FIG. 5, responding wireless stations 102($i$), 102($j$) and 102($k$) ($i,j,k\in[1,N]$) and initiating wireless station 104($m$) ($m\in[1,M]$) are located inside enclosure (e.g., a building, a shopping mall, a university or school building, or an airport terminal) 502. There may or may not be one or more walls (not shown) separating one or all of the responding wireless stations 102, the initiating wireless station 104, and the server device 106 from each other. A coordinate system 504 is conceptually provided with an arbitrary origin 506, which is located interior to the enclosure (in other embodiments, the origin 506 can be located exterior to the enclosure). The locations of the responding wireless stations 102($i$), 102($j$) and 102($k$) can be defined by points relative to the origin 506 and have respective values $P_i=(x_i,y_i,z_i)$, $=(x_j,y_j,z_j)$ and $P_k=(x_k,y_k,z_k)$. Using trilateration, and based at least in part on the points $P_i$, $P_j$ and $P_k$ and the distances $D_i$, $D_j$, and $D_k$ of the initiating wireless station 104($m$) to the respective points $P_i$, $P_j$ and $P_k$, the initiating wireless station 104($m$) can determine its location as point $P_m=(x_m,y_m,z_m)$, relative to the origin 506, as described above. In other embodiments, more than three access points can be used by initiating wireless stations 104 to determine their positions using, for example, multilateration. The FTM module 446 can store the determined location data in memory 423 or any other suitable memory accessible to the FTM module 446 (e.g., memory 422 or storage 428). As explained below, user applications 450 can access the stored location data for use in user applications.

As explained above, in some embodiments an initiating wireless station 104 can transmit an availability message to a responding wireless station 102 prior to the responding wireless station transmitting any timing messages to an initiating wireless station 104. In some such embodiments, the availability message can be transmitted after the transmission of an FTM session request. The availability message can include, but is not limited to, time periods when the initiating wireless station 104 will be available to exchange timing messages with the responding wireless stations 102 (e.g., when the individual initiating wireless stations 104 are not dedicated to other processes that would prevent the exchange of timing messages, based upon available resources). The initiating wireless stations 104 can reserve resources during the time periods for timing message exchange through scheduling daemons (not shown) associated with the initiating wireless stations 104.

The one or more user applications 450 can perform any number of functions, including enabling a user to view and/or interact with content (e.g., text, data, video, multimedia, or other information). In some embodiments, a user application 450 may communicate with the FTM module 446 to obtain customized results associated with the location of the initiating wireless station 104. For example, the user application 450 can request that the FTM module 446 provide a certain number of determined approximate locations of the initiating wireless station 104 (e.g., 3, 5, 10, etc., determined locations). User applications 450 that rely more heavily on the precise location of the initiating wireless station 104, for example, may receive a greater number of approximate locations from the FTM module 446 to increase the likelihood that at least one of the approximate locations includes the precise location of the initiating wireless station 104. The user applications 450 that may rely less on the precise location of the initiating wireless station 104 can receive relatively fewer (e.g., one location) approximate locations of the initiating wireless station 104 from the FTM module 446, in another example. In this way, the FTM module 446 may provide customized results to various user applications 450, program modules, computing devices, etc., based on the severity (e.g., high corresponding to a need for a relatively high number of possible locations of the initiating wireless station 104; medium corresponding to a need for relatively fewer possible locations of the initiating wireless station 104; and low corresponding to a need for relatively the fewest number of possible locations of the initiating wireless station 104) or the need for improved localization of the initiating wireless station 104, in certain embodiments.

The server device 106 can include one or more processors 452 configured to communicate with one or more memory devices and various other components or devices of the initiating wireless stations 104. For example, the server device 106 can include the processors 446 and one or more communication connections 409 (including radios and antennas (not shown) as describe above) and memory 424. The processors 452, communication connections 409 and memory 424 can be implemented as appropriate in hardware, software, firmware or any combination thereof. According to one configuration, the processors 452 can execute instructions associated with software in the memory 424.

In some embodiments, the server device 106 can communicate the locations of the responding wireless stations 102 to the initiating wireless stations 104, as described above. In some embodiments, the locations of the responding wireless stations 102 can be stored in storage 430 and communicated to the responding wireless stations 102 via the communication connections 409 and through the networks 402. As discussed above, in some embodiments, the locations of the responding wireless stations 102 can be points on a coordinate system. In some embodiments, one or more applications 445 can facilitate entry and management of the locations of the responding wireless stations 102. For example, an application 445 can allow a system administrator or other user of the location determination system 100 to enter the, or to alter already entered, locations (e.g., coordinates) of the responding wireless stations 102. The application 445 can store the entered, or altered, locations in storage 430. In some such embodiments, a user application 445 can facilitate entry of altering of responding wireless station locations through the networks 402, as described above.

Location Determination Processes

Figure 6:
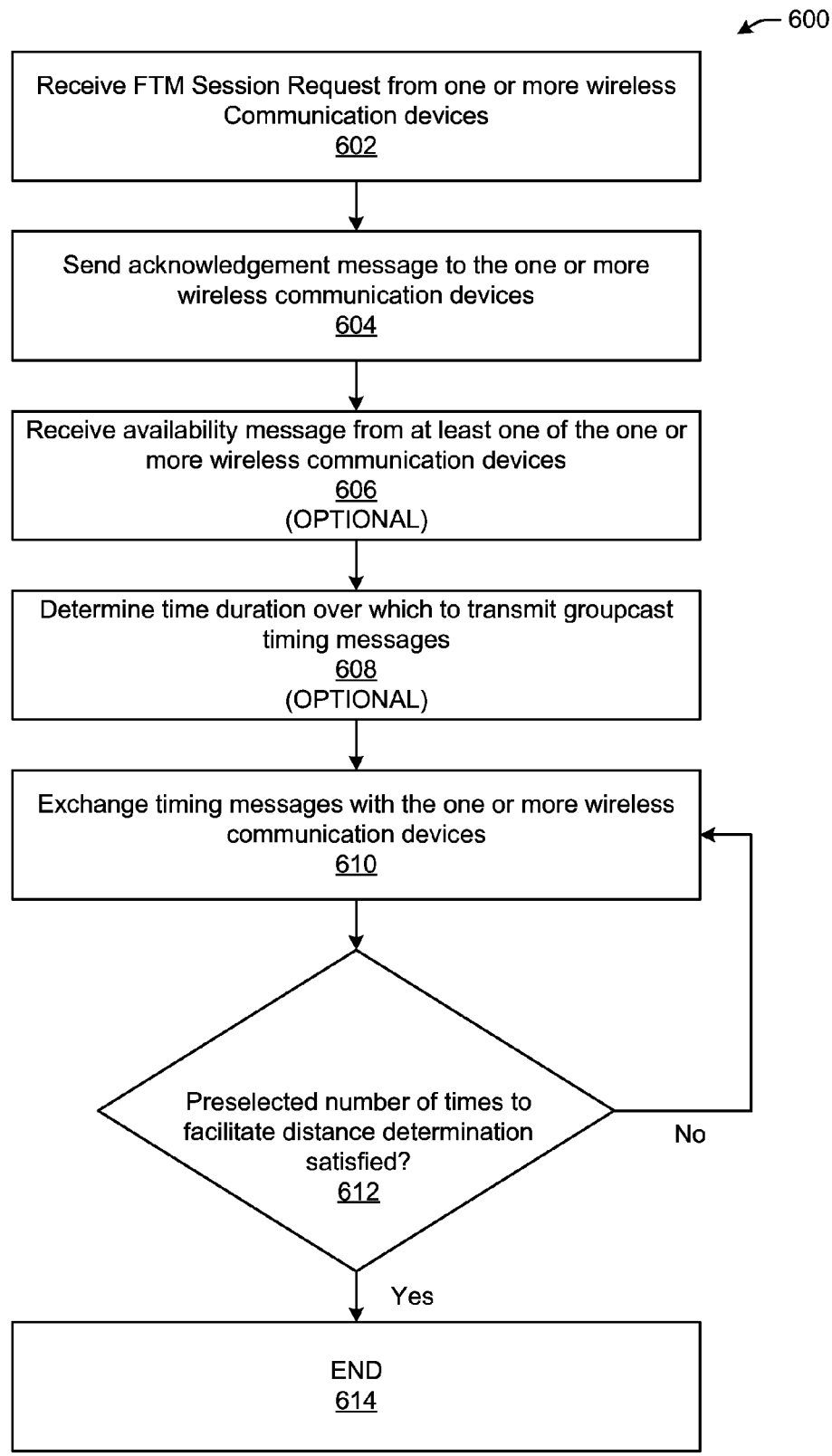
FIG. 6 is a flow diagram illustrating an example embodiment of a process for facilitating location determination by a responding wireless station using groupcast communication techniques.

FIG. 6 is a flow diagram illustrating an example embodiment of a process for facilitating location determination by a responding wireless station using groupcast communication techniques. The example process 600 can be implemented by a responding wireless station 102, in one embodiment. The example process 600 can begin at block 602, where an FTM session request is received by the responding wireless station 102 from one or more of the initiating wireless stations 104. In some embodiments, the responding wireless station 102 can accept FTM session requests periodically and for a preselected duration during each period. For example, the responding wireless station 102 can be configured to accept FTM session requests from one or more of the initiating wireless stations 104 every X>0 milliseconds for a duration of Y≤X milliseconds. The process continues to block 604 where the responding wireless station 102 can transmit an acknowledgment message, as described above, to the responding wireless stations 102 that sent FTM transmission requests. As described above, in some embodiments, the acknowledgement message can include one or more time window (e.g., an allocation to the initiating wireless stations 104) during which the responding wireless station 102 will exchange timing messages with the initiating wireless stations 104. In additional or alternative embodiments, the acknowledgment message can include the number of times, N, that the responding wireless station 102 will facilitate a distance determination. In some embodiments, the responding wireless station 102 can set an internal counter to N. The process then continues to optional block 606 or block 610.

At block 606, as described above, the responding wireless station 102 can receive availability messages from at least one of the initiating wireless stations 104 that requested FTM sessions. The process then continues to optional block 608 where, based at least in part on the availabilities of the initiating wireless stations 104 and the availability of the responding wireless station 102, the responding wireless station 102 determines a time to transmit groupcast timing messages, also as described above. For example, the responding wireless station 102 can determine a time duration over which the responding wireless stations 102 will exchange timing messages with the initiating wireless stations 104 such that the FTM session allows an increased number of initiating wireless stations 104 to determine their respective distances from the responding wireless station 102. For example, in one embodiment, the responding wireless station can receive the time intervals over which the initiating wireless stations 104 are available to exchange messages and, based at least in part the responding wireless station 102's availability to exchange timing messages, select a time interval that overlaps with a maximum number of received time intervals. In some embodiments, as described above and below, the availability messages can be received within one or more of the one or more time windows the responding wireless station 102 indicated its availability to exchange timing messages. The method then continues to block 610.

At block 610 the responding wireless station 102 exchanges timing messages with the initiating wireless stations 104 to facilitate a first distance determination by the initiating wireless stations 104 using groupcast communication techniques. As described above, one, some or all of the timing messages transmitted by the responding wireless station 102 during block 610 are transmitted using a groupcast protocol. The number of timing messages sent and/or received by the responding wireless station 102 can vary in a known manner, based upon the selected method of calculating the distances. The timing messages can include the unique identifier allocated by the responding wireless station 102 to the initiating wireless stations 104 that requested FTM sessions, as described above. The process then continues to block 612. At block 612, the responding wireless station 102 determines if the preselected number of times the responding wireless station 102 is to facilitate a distance determination is satisfied, as described above. For example, in one embodiment, the wireless device 104 can decrement an internal counter and determine if the counter is equal to 0, indicating that the responding wireless station has facilitated a distance determination the preselected number of times, as explained above. If the number of times the responding wireless station 102 is to facilitate a distance determination is satisfied, the process continues to block 614, where the process ends. If not, the process returns to block 610.

Figure 7:
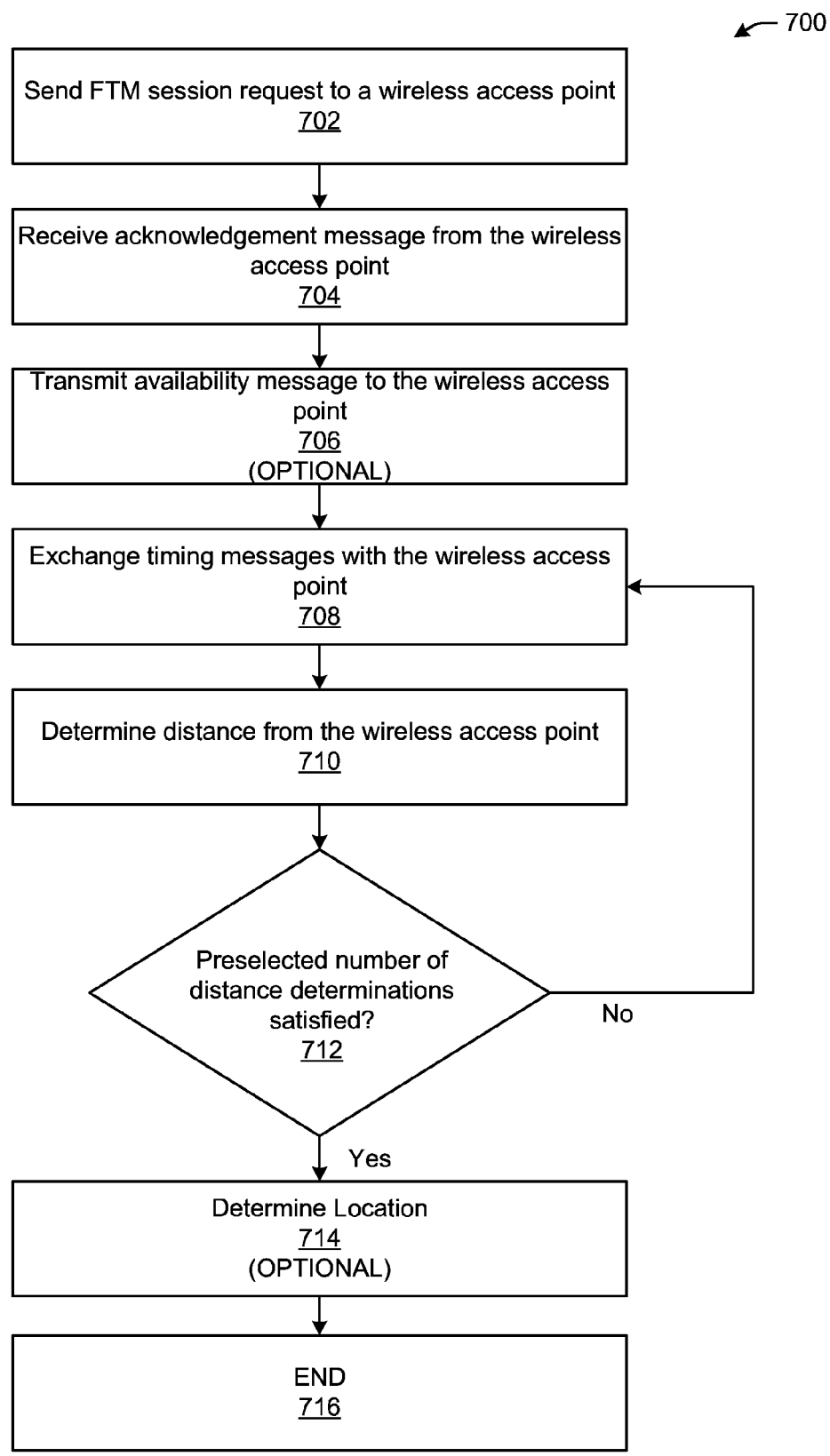
FIG. 7 is a flow diagram illustrating an example embodiment of a process for facilitating location determination by an initiating wireless station using groupcast communication techniques.

FIG. 7 is a flow diagram illustrating an example embodiment of a process for facilitating location determination by a wireless communication device 104 using groupcast communication techniques. The example process 700 can be implemented by an initiating wireless station 104, in one embodiment. The example process 700 can begin at block 702, where an initiating wireless station 104 transmits an FTM session request to a responding wireless station 102. The process continues to block 704 where the responding wireless station 102 can transmit an acknowledgement message to the responding wireless station 102. In some embodiments, as described above, the acknowledgement message can include one or more time windows over which the responding wireless station 102 will be available to exchange timing messages with the initiating wireless station 104. In some embodiments, also as described above, the acknowledgement message can include the number of times, N, that the responding wireless station 102 will facilitate a distance determination. In some embodiments, the initiating wireless station 104 can set an internal counter to N. The process then continues to optional block 706 or bock 708.

At optional block 706, as described above, the initiating wireless station 104 can transmit an availability message to the responding wireless station 102. In some embodiments, also as described above, the initiating wireless station 104 can transmit the availability message within the time window during which the responding wireless station 102 indicated its availability to exchange timing messages (e.g., at or near the start of a time window). The process then continues to step 708.

At step 708, the initiating wireless station 104 can exchange timing messages with the responding wireless station 102. For example, the initiating wireless station 104 can exchange timing messages with the responding wireless station 102 during the one or more of time windows received from the responding wireless station 102 in the acknowledgement message. In some embodiments, in which block 706 is implemented, the initiating wireless station 104 can exchange timing messages with the responding wireless station 102 during the one or more time windows and after transmission of one or more trigger frames, as described above. As described above, the timing messages received from the responding wireless station 102 can be groupcast timing messages. The initiating wireless station 104 can interrogate received timing messages to identify unique identifiers therein. The initiating wireless station 104 can process the received timing messages and extract information associated with a unique identifier therein. The unique identifier can be allocated to the initiating wireless station 104 by the responding wireless station 102, as described above, during a handshaking procedure and/or in the acknowledgement message sent by the responding wireless station 102. The process then continues to step 710.

At step 710, the initiating wireless station 104 determines its distance from the responding wireless station 102 from the responding wireless station, as described above. The distance can be stored in any suitable memory of the initiating wireless station 104 (e.g., memories 422, 423 or storage 428). The method then continues to block 712. At block 712, the initiating wireless station 104 determines if the number of preselected distance determinations is satisfied. For example, in some embodiments, the initiating wireless station 104 can decrement a counter, as described above and determine if the decremented value is equal to 0 (e.g., the number of preselected distance determinations is satisfied). If so, the process continues to optional block 714 or the block 716. If not, the process returns to step 708.

At block 714, the initiating wireless station 104 can determination its location using trilateration or multilateration techniques as described above, using distance determinations from two or more other responding wireless stations 102. In embodiments in which the number of distance determinations to the responding wireless station 102 is greater than one, the arithmetic mean of the distance determinations can be used as the distance between the responding wireless station 102 and the initiating wireless station 104 in the trilateration or multilateration technique. The distances to two or more other responding wireless stations 102 can be obtained from processes similar to example process 700, implemented with the two or more other responding wireless stations 102 and the respective distances to the two or more other responding wireless stations 102 can be obtained from any suitable memory of the initiating wireless station 104, as described above.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Further Embodiments

In a first example embodiment there is disclosed a responding wireless station including a memory having computer instructions stored thereon and a processor. The processor is configured to access the memory and execute the computer instructions to transmit, using a one-to-many communication protocol, one or more timing messages to a plurality of initiating wireless stations, where the one or more timing messages include a plurality of unique identifiers associated with the respective plurality of initiating wireless stations and where a first timing message of one or more timing messages includes an instruction to the plurality of initiating wireless stations to record the time the first message is received by the respective plurality of initiating wireless stations. In some embodiments, the one-to-many communication protocol includes a groupcast communication protocol.

In some embodiments, the processor is configured to access the memory and execute further computer instructions to transmit, to the plurality of initiating wireless stations, a time window, prior to transmitting the one or more timing messages, where the time window correspond to a duration of time when resources of the responding wireless station will be available to transmit the one or more timing messages and where the computer instructions to transmit one or more timing messages includes computer instructions to transmit at least one of the one or more timing messages within the time windows. In additional or alternative embodiments, the processor is configured to access the memory and execute further instructions to receive, from the plurality of initiating wireless stations, requests to receive timing messages from the responding wireless station, where the computer instructions to transmit a time window further include computer instructions to transmit a time window responsive to the receiving requests. In additional or alternative embodiments, the processor is configured to access the memory and execute further instructions to receive, from at least one of the plurality of initiating wireless stations, one or more trigger frames including an indication that the initiating wireless station is available to receive the at least one of the one or more timing messages, where the one or more trigger frames are received within the time window and where the computer instructions to transmit the at least one of the one or more timing messages within the time window further include computer instructions to transmit the at least one of the one or more timing messages responsive to receiving the one or more trigger frames.

In some embodiments, the processor is configured to access the memory and execute further instructions to transmit, a second timing message including a time that the first timing message was transmitted by the responding wireless station. In some such embodiments, the one or more timing messages includes the second timing message.

In some embodiments, the processor is configured to access the memory and execute further instructions to receive, from at least one of the plurality of initiating wireless stations, an acknowledgment message and record, responsive to receiving the acknowledgment message, the time the acknowledgment message is received. In some such embodiments, a third timing message of the one or more timing messages includes the time that second timing message was received and, logically associated therewith, the unique identifier associated with the at least one of the plurality of initiating wireless stations.

In a second example embodiments, there is disclosed an initiating wireless station including a memory having computer instructions stored thereon and a processor. The processor is configured to access the memory and execute the computer instructions to receive, from a responding wireless station and using a one-to-many communication protocol, one or more timing messages including timing data, where the one or more timing messages include a plurality of unique identifiers respectively associated with a plurality of initiating wireless stations including the initiating wireless station. The processor is additionally configured to access the memory and execute the computer instructions to identify, based at least in part on the unique identifier associated with the initiating wireless station, timing data from the one or more timing messages and determine, based at least in part on the identified timing data, a first distance between the initiating wireless station and the responding wireless station. In some embodiments, the one-to-many communication protocol includes a groupcast communication protocol.

In some embodiments, the processor is configured to access the memory and execute further computer instructions to receive, from the responding wireless station, a time window, prior to the receiving one or more timing messages, where the computer instructions to receive the one or more timing messages further includes computer instructions to receive at least one of the one or more timing messages within the time windows and where the time window corresponds to a duration of time when resources of the responding wireless station are available to transmit the one or more timing messages. In additional or alternative embodiments, the processor is configured to access the memory and execute further computer instructions to transmit, to the responding wireless station, a request to receive one or more timing messages, where the computer instructions to transmit the request further include computer instructions to transmit the request prior to receiving the time window. In additional or alternative embodiments, the processor is configured to access the memory and execute further computer instructions to transmit, to the responding wireless station and within the time window, one or more trigger frames including an indication that the initiating wireless station is available to receive the at least one of the one or more timing messages, where the computer instructions to receive the at least one of the one or more timing messages within the time window further includes computer instructions to receive the at least one of the one or more timing messages responsive to transmitting the one or m more trigger frames.

In some embodiments, the processor is configured to access the memory and execute further computer instructions to receive, from the responding wireless station, a second timing message including a time that a first timing message was transmitted by the responding wireless station, where the one or more timing messages include the first timing message. In some such embodiments, the one or more timing messages include the second timing message.

In some embodiments, the processor is configured to access the memory and execute further computer instructions to transmit, to the responding wireless station and responsive to receiving a first timing message from the responding wireless station, an acknowledgement message, where receipt, by the responding wireless station, of the transmitted acknowledgement message configures the responding wireless station to record the time the acknowledgment message is received. In some such embodiments, a second timing message of the one or more timing messages includes the time that the first timing message was received by the responding wireless station.

In some embodiments, the processor is configured to access the memory and execute further computer instructions to receive, one or more additional timing messages from a plurality of additional responding wireless stations, where the additional timing messages include respective additional timing data and determine, based at least in part on the additional timing data, additional distances between the initiating wireless station and the respective plurality of additional responding wireless stations. The processor is also configured to access the memory and execute further computer instruction to determine, based at least in part on the first distance and the additional distances, the location of the initiating wireless station.

In a third example embodiment, there is disclosed a method including transmitting, by a responding wireless station including a processor and accessible memory, one or more timing messages to a plurality of initiating wireless stations, the transmitting including transmitting the one or more timing messages using a one-to-many communication protocol. The messages include unique identifiers associated with the respective plurality of initiating wireless stations and a first timing message of one or more timing messages includes an instruction to the plurality of initiating wireless stations to record the time the first message is received by the respective plurality of initiating wireless stations. In some embodiments, the one-to-many communication protocol includes a groupcast communication protocol.

In some embodiments, the method further includes transmitting, by the responding wireless station and to the plurality of initiating wireless stations, a time window, prior to transmitting the one or more timing messages, where the transmitting the one or more timing messages includes transmitting at least one of the one or more timing messages within the time windows and where the time window correspond to a duration of time when resources of the responding wireless station are available to transmit the one or more timing messages. In additional or alternative embodiments, the method further includes receiving, by the responding wireless station and from the plurality of initiating wireless stations, requests to receive timing messages from the responding wireless station, where the transmitting the time window is responsive to the receiving the requests. In additional or alternative embodiments, the method further includes receiving, by the responding wireless station and from at least one of the plurality of initiating wireless stations, one or more trigger frames including an indication that the initiating wireless station is available to receive the at least one of the one or more timing messages, where the one or more trigger frame are received within the time window and where the transmitting the at least one of the one or more timing messages within the time window includes transmitting the at least one of the one or more timing messages responsive to receiving the one or more trigger frames.

In some embodiments, the method further includes transmitting, by the responding wireless station, a second timing message including a time that the first timing message was transmitted by the responding wireless station. In some such embodiments, the one or more timing messages includes the second timing message.

In some embodiments, the method further includes receiving, by the responding wireless station and from at least one of the plurality of initiating wireless stations, an acknowledgement message and recording, by the responding wireless station and responsive to receiving the acknowledgement message, the time the acknowledgement message is received. In some such embodiments, a third timing message of the one or more timing messages includes the time that second timing message was received and, logically associated therewith, the unique identifier associated with the at least one of the plurality of initiating wireless stations.

In a fourth example embodiments, there is disclosed a method including receiving, by an initiating wireless station including a processor and accessible memory, one or more timing messages including timing data from a responding wireless station, where the one or more timing messages are received using a one-to-many communication protocol and where the one or more timing messages including a plurality of unique identifiers respectively associated with a plurality of initiating wireless stations including the initiating wireless station. The method further includes, identifying, based at least in part on the unique identifier associated with the initiating wireless stations, timing data from the one or more timing messages and determining, by the initiating wireless station and based at least in part on the identified timing data, a first distance between the initiating wireless station and the responding wireless station. In some embodiments, the one-to-many communication protocol includes a groupcast communication protocol.

In some embodiments, the method further includes, receiving, by the initiating wireless station from the responding wireless station, a time window, prior to the receiving one or more timing messages, where the receiving the one or more timing messages includes receiving at least one of the one or more timing messages within the time windows and where the time window corresponds to a duration of time when resources of the responding wireless station are available to transmit the one or more timing messages. In additional or alternative embodiments, the method further includes transmitting, by the initiating wireless station to the responding wireless station, a request to receive one or more timing messages, where the transmitting the request is prior to receiving the time window. In additional or alternative embodiments, the method further includes transmitting, by the initiating wireless station to the responding wireless station and within the time window, one or more trigger frames including an indication that the initiating wireless station is available to receive the at least one of the one or more timing messages, where the receiving the at least one of the one or more timing messages within the time window includes receiving the at least one of the one or more timing messages responsive to transmitting the one or more trigger frames.

In some embodiments, the method further includes receiving, by the initiating wireless station and from the responding wireless station, a second timing message including a time that a first timing message was transmitted by the responding wireless station, where the one or more timing messages includes the first timing message. In some such embodiments, the one or more timing messages includes the second timing message.

In some embodiments, the method further includes transmitting, by the initiating wireless station to the responding wireless station and responsive to receiving a first timing message from the responding wireless station, an acknowledgement message, where receipt, by the responding wireless station, of the transmitted acknowledgement message configures the responding wireless station to record the time the acknowledgement message is received. In some such embodiments, a second timing message of the one or more timing messages includes the time that the first timing message was received by the responding wireless station.

In some embodiments, the method further includes receiving, by the initiating wireless station; one or more additional timing messages from a plurality of additional responding wireless stations, where the additional timing messages include respective additional timing data, and determining, by the initiating wireless station and based at least in part on the additional timing data, additional distances between the initiating wireless station and the respective plurality of additional responding wireless stations. In such embodiments, the method further includes determining, by the wireless communication device, and based at least in part on the first distance and the additional distances, the location of the initiating wireless station.

In a fifth example embodiment, there is disclosed one or more computer-readable media storing computer-executable instructions that, when executed by at least one processor, configure the at least one processor to perform operations including transmitting, by a responding wireless station including a processor and accessible memory, one or more timing messages to a plurality of initiating wireless stations, where the transmitting includes transmitting the one or more timing messages using a one-to-many communication protocol, where the messages include unique identifiers associated with the respective plurality of initiating wireless stations, and where a first timing message of one or more timing messages includes an instruction to the plurality of initiating wireless stations to record the time the first message is received by the respective plurality of initiating wireless stations. In some embodiments, the one-to-many communication protocol includes a groupcast communication protocol.

In some embodiments, the one or more computer readable media include further computer-executable instructions that, when executed by the at least one processor, configure the at least one processor to perform operations including transmitting, by the responding wireless station and to the plurality of initiating wireless stations, a time window, prior to transmitting the one or more timing messages, where the transmitting the one or more timing messages includes transmitting at least one of the one or more timing messages within the time windows and where the time window correspond to a duration of time when resources of the responding wireless station are available to transmit the one or more timing messages. In additional or alternative embodiments, the one or more computer readable include further computer-executable instructions that, when executed by the at least one processor, configure the at least one processor to perform operations including receiving, by the responding wireless station and from the plurality of initiating wireless stations, requests to receive timing messages from the responding wireless station, where the transmitting the time window is responsive to the receiving the requests. In additional or alternative embodiments, the one or more computer readable media include further computer-executable instructions that, when executed by at least one processor, configure the at least one processor to perform operations including receiving, by the responding wireless station and from at least one of the plurality of initiating wireless stations, one or more trigger frames including an indication that the initiating wireless station is available to receive the at least one of the one or more timing messages, where the one or more trigger frames are received within the time window and where the transmitting the at least one of the one or more timing messages within the time window includes transmitting the at least one of the one or more timing messages responsive to receiving the one or more trigger frames.

In some embodiments, the one or more computer readable media include further computer-executable instructions that, when executed by the at least one processor, configure the at least one processor to perform operations including transmitting, by the responding wireless station, a second timing message including a time that the first timing message was transmitted by the responding wireless station. In some such embodiments, the one or more timing messages includes the second timing message.

In some embodiments, the one or more computer readable media include further computer-executable instructions that, when executed by the at least one processor, configure the at least one processor to perform operations including receiving, by the responding wireless station and from at least one of the plurality of initiating wireless stations, an acknowledgement message and recording, by the responding wireless station and responsive to receiving the acknowledgement message, the time the acknowledgement message is received. In some such embodiments, a third timing message of the one or more timing messages includes the time that second timing message was received and, logically associated therewith, the unique identifier associated with the at least one of the plurality of initiating wireless stations.

In a sixth example embodiment, there is disclosed one or more computer-readable media storing computer-executable instructions that, when executed by at least one processor, configure the at least one processor to perform operations including receiving, by an initiating wireless station including a processor and accessible memory, one or more timing messages including timing data from a responding wireless station, where the one or more timing messages are received using a one-to-many communication protocol and where the one or more timing messages including a plurality of unique identifiers respectively associated with a plurality of initiating wireless stations including the initiating wireless station. The computer-readable media further include computer-executable instructions, that when executed by the at least one processor, configure the at least one processor to perform operations including identifying, based at least in part on the unique identifier associated with the initiating wireless stations, timing data from the one or more timing messages and determining, by the initiating wireless station and based at least in part on the identified timing data, a first distance between the initiating wireless station and the responding wireless station. In some embodiments, the one-to-many communication protocol includes a groupcast communication protocol.

In some embodiments, the one or more computer readable media include further computer-executable instructions that, when executed by at least one processor, configure the at least one processor to perform operations including receiving, by the initiating wireless station from the responding wireless station, a time window, prior to the receiving one or more timing messages, where the receiving the one or more timing messages includes receiving at least one of the one or more timing messages within the time window and where the time window corresponds to a duration of time when resources of the responding wireless station are available to transmit the one or more timing messages. In additional or alternative embodiments, the one or more computer readable media include further computer-executable instructions that, when executed by at least one processor, configure the at least one processor to perform operations including transmitting, by the initiating wireless station to the responding wireless station, a request to receive one or more timing messages, where the transmitting the request is prior to receiving the time window. In additional or alternative embodiments, the one or more computer readable media include further computer-executable instructions that, when executed by at least one processor, configure the at least one processor to perform operations including transmitting, by the initiating wireless station to the responding wireless station and within the time window, one or more trigger frames including an indication that the initiating wireless station is available to receive the at least one of the one or more timing messages, where the receiving the at least one of the one or more timing messages within the time window includes receiving the at least one of the one or more timing messages responsive to transmitting the one or more trigger frames.

In some embodiments, the one or more computer readable media include further computer-executable instructions that, when executed by the at least one processor, configure the at least one processor to perform operations including receiving, by the initiating wireless station and from the responding wireless station, a second timing message including a time that a first timing message was transmitted by the responding wireless station, where the one or more timing messages includes the first timing message. In some such embodiments, the one or more computer readable media further include one or more timing messages includes the second timing message.

In some embodiments, the one or more computer readable media include further computer-executable instructions that, when executed by at least one processor, configure the at least one processor to perform operations including transmitting, by the initiating wireless station to the responding wireless station and responsive to receiving a first timing message from the responding wireless station, an acknowledgement message, where receipt, by the responding wireless station, of the transmitted acknowledgement message configures the responding wireless station to record responding wireless station the time the acknowledgement message is received. In some such embodiments, a second timing message of the one or more timing messages includes the time that the first timing message was received by the responding wireless station.

In some embodiments, the one or more computer readable media include further computer-executable instructions that, when executed by the at least one processor, configure the at least one processor to perform operations including receiving, by the initiating wireless station, one or more additional timing messages from a plurality of additional responding wireless stations, where the additional timing messages include respective additional timing data and determining, by the initiating wireless station and based at least in part on the additional timing data, additional distances between the initiating wireless station and the respective plurality of additional responding wireless stations. In such embodiments, the one or more computer readable media include further computer-executable instructions that, when executed by the at least one processor, configure the at least one processor to perform operations including determining, by the initiating wireless station and based at least in part on the first distance and the additional distances, the location of the initiating wireless station.

In a seventh example embodiment, there is disclosed, a responding wireless station, including one or more radios and one or more antennas. The responding wireless station further includes a means for transmitting one or more timing messages to a plurality of initiating wireless stations using a one-to-many communication protocol, where the messages include unique identifiers associated with the respective plurality of initiating wireless stations and where a first timing message of the one or more timing messages includes an instruction to the plurality of initiating wireless stations to record the time the first message is received by the respective plurality of initiating wireless stations. In some embodiments, the one-to-many communication protocol includes a groupcast communication protocol.

In some embodiments, the responding wireless station further includes a means for transmitting, to the plurality of initiating wireless stations, a time window, prior to transmitting the one or more timing messages, where the means for transmitting one or more timing messages further includes a means for transmitting at least one of the one or more timing messages within the time windows and where the time window corresponds to a duration of time when resources of the responding wireless station are available to transmit the one or more timing messages. In additional or alternative embodiments, the responding wireless station further includes a means for receiving, from the plurality of initiating wireless stations, requests to receive timing messages from the responding wireless station, where the means for transmitting a time window further includes a means for transmitting the time window responsive to the receiving the requests. In additional or alternative embodiments, the responding wireless station further includes a means for receiving, from at least one of the plurality of initiating wireless stations, one or more trigger frames including an indication that the initiating wireless station is available to receive the at least one of the one or more timing messages, where the one or more trigger frames are received within the time window and where the means for transmitting at least one of the one or more timing messages further includes a means for transmitting at least one of the one or more timing messages responsive to receiving the one or more trigger frames.

In some embodiments, the responding wireless station further includes a means for transmitting, to at least one of the plurality of initiating wireless stations, a second timing message including a time that the first timing message was transmitted by the apparatus. In some such embodiments, the one or more timing messages includes the second timing message.

In some embodiments, the responding wireless station further includes, a means for receiving, from at least one of the one or more of the plurality of initiating wireless stations, an acknowledgement message and a means for recording, responsive to receiving the acknowledgement message, the time the acknowledgement message is received. In some such embodiments, a third timing message of the one or more timing messages includes the time that second timing message was received and, logically associated therewith, the unique identifier associated with the at least one of the plurality of initiating wireless stations.

In an eight example embodiment, there is disclosed, an initiating wireless station including one or more radios and one or more antennas. The initiating wireless station further includes a means for receiving, from a responding wireless station and using a one-to-many communication protocol, one or more timing messages including timing data, where the one or more timing messages include a plurality of unique identifiers respectively associated with a plurality of initiating wireless stations including the initiating wireless station. The initiating wireless station further includes a means for identifying, based at least in part on the unique identifier associated with the initiating wireless station, timing data from the one or more timing messages and a means for determining, based at least in part on the identified timing data, a first distance between the initiating wireless station and the responding wireless station. In some embodiments, the one-to-many communication protocol includes a groupcast communication protocol.

In some embodiments, initiating wireless station further includes a means for receiving, from the responding wireless station, a time window, prior to the receiving one or more timing messages, where the means for receiving the one or more timing messages further includes a means for receiving at least one of the one or more timing messages within the time windows and where the time window corresponds to a duration of time when resources of the responding wireless station are available to transmit the one or more timing messages. In additional or alternative embodiments, initiating wireless station further includes a means for transmitting, to the responding wireless station and prior to receiving the time window, a request to receive one or more timing messages. In additional or alternative embodiments, initiating wireless station further includes a means for transmitting, to the responding wireless station and within the time window, one or more trigger frames including an indication that the initiating wireless station is available to receive the at least one of the one or more timing messages, where the means for receiving the at least one of the one or more timing messages within the time window further includes a means for receiving the at least one of the one or more timing messages responsive to transmitting the one or more trigger frames.

In some embodiments, initiating wireless station further includes a means for receiving, from the responding wireless station, a second timing message including a time that a first timing message was transmitted by the responding wireless station, where the one or more timing messages include the first timing message. In some such embodiments, the one or more timing messages include the second timing message.

In some embodiments, initiating wireless station further includes a means for transmitting, to the responding wireless station and responsive to receiving a first timing message from the responding wireless station, an acknowledgement message, where receipt, by the responding wireless station, of the transmitted acknowledgement message configures the responding wireless station to record the time the acknowledgement message is received. In some such embodiments, a second timing message of the one or more timing messages includes the time that the first timing message was received by the responding wireless station.

In some embodiments, initiating wireless station further includes a means for receiving one or more additional timing messages from a plurality of additional responding wireless stations, where the additional timing messages include respective additional timing data. In such embodiments, initiating wireless station further includes a means for determining, based at least in part on the additional timing data, additional distances between the initiating wireless station and the respective plurality of additional responding wireless stations and a means for determining, based at least in part on the first distance and the additional distances, the location of the initiating wireless station.

The invention claimed is:

1. A responding wireless station comprising:
 a memory having computer instructions stored thereon;
 a processor configured to access the memory and execute the computer instructions to:
  transmit, using a one-to-many communication protocol, one or more timing messages to a plurality of initiating wireless stations, wherein:
   the one or more timing messages comprise a plurality of unique identifiers associated with the plurality of initiating wireless stations, and
   a first timing message of the one or more timing messages includes an instruction to the plurality of initiating wireless stations to record a time the first timing message is received by the plurality of initiating wireless stations;

transmit, to the plurality of initiating wireless stations, a time window, prior to transmitting the one or more timing messages, wherein:
  the time window corresponds to a duration of time when resources of the responding wireless station will be available to transmit the one or more timing messages, and
  the computer instructions to transmit the one or more timing messages further comprises computer instructions to transmit at least one of the one or more timing messages within the time window; and
determine, from at least one of the plurality of initiating wireless stations, one or more trigger frames comprising an indication that the plurality of initiating wireless stations are available to receive the at least one of the one or more timing messages, wherein:
  the one or more trigger frames are received within the time window, and
the computer instructions to transmit the at least one of the one or more timing messages within the time window further comprises computer instructions to transmit the at least one of the one or more timing messages responsive to receiving the one or more trigger frames.

2. The responding wireless station of claim 1, wherein the one-to-many communication protocol comprises a groupcast communication protocol.

3. The responding wireless station of claim 1, wherein the processor is configured to access the memory and execute instructions to further cause the processor to:
  receive, from the plurality of initiating wireless stations, requests to receive timing messages from the responding wireless station, and wherein the computer instructions to transmit a time window further comprise computer instructions to transmit a time window responsive to the receiving requests.

4. The responding wireless station of claim 1, wherein the processor is configured to access the memory and execute instructions to further cause the processor to:
  transmit, a second timing message comprising a time that the first timing message was transmitted by the responding wireless station.

5. The responding wireless station of claim 1, wherein the processor is configured to access the memory and execute instructions to further cause the processor to:
  receive, from at least one of the plurality of initiating wireless stations, an acknowledgement message, and
  record, responsive to receiving the acknowledgement message, the time the acknowledgement message is received.

6. An initiating wireless station comprising:
  a memory having computer instructions stored thereon;
  a processor configured to access the memory and execute the computer instructions to:
  receive, from a responding wireless station, a time window, wherein:
    the computer instructions comprise at least one instruction to receive one or more timing messages within the time window, and
    the time window corresponds to a duration of time when resources of the responding wireless station are available to transmit the one or more timing messages;
  transmit, to the responding wireless station and within the time window, one or more trigger frames comprising an indication that the initiating wireless station is available to receive the one or more timing messages, and
  wherein the at least one instruction to receive the one or more timing messages within the time window further comprises a first instruction to cause the processor to:
    receive the at least one of the one or more timing messages responsive to transmitting the one or more trigger frames;
  receive, from the responding wireless station, one or more timing messages comprising timing data, using a one-to-many communication protocol, wherein:
    the one or more timing messages comprise a plurality of unique identifiers associated with a plurality of initiating wireless stations;
  identify, based at least in part on the unique identifier associated with the initiating wireless station, timing data from the one or more timing messages; and
  determine, based at least in part on the identified timing data, a first distance between the initiating wireless station and the responding wireless station.

7. The initiating wireless station of claim 6, wherein the one-to-many communication protocol comprises a groupcast communication protocol.

8. The initiating wireless station of claim 6, wherein the processor is configured to access the memory and execute computer instructions to further cause the processor to:
  transmit, to the responding wireless station, a request to receive one or more timing messages, and wherein the computer instructions to transmit the request further comprise computer instructions to transmit the request prior to receiving the time window.

9. The initiating wireless station of claim 6, wherein the processor is configured to access the memory and execute computer instructions to further cause the processor to:
  receive, from the responding wireless station, a second timing message comprising a time that a first timing message was transmitted by the responding wireless station, and wherein the one or more timing messages comprise the first timing message.

10. The initiating wireless station of claim 9, wherein the processor is configured to access the memory and execute computer instructions to further cause the processor to:
  transmit, to the responding wireless station and responsive to receiving a first timing message from the responding wireless station, an acknowledgement message, wherein receipt, by the responding wireless station, of the acknowledgement message configures the responding wireless station to record the time the acknowledegement message is received.

11. The initiating wireless station of claim 6, wherein the processor is configured to access the memory and execute computer instructions to further cause the processor to:
  receive, one or more additional timing messages from a plurality of additional responding wireless stations, wherein the additional timing messages comprise respective additional timing data;
  determine, based at least in part on the additional timing data, additional distances between the initiating wireless station and the plurality of additional responding wireless stations; and
  determine, based at least in part on the first distance and the additional distances, a location of the initiating wireless station.

12. One or more non-transitory computer-readable media storing computer-executable instructions that, when executed by at least one processor, configure the at least one processor to perform operations comprising:

transmitting, by a responding wireless station comprising the at least one processor, one or more timing messages to a plurality of initiating wireless stations, using a one-to-many communication protocol, wherein:
   the messages comprise unique identifiers associated with the respective plurality of initiating wireless stations, and
   a first timing message of one or more timing messages includes an instruction to the plurality of initiating wireless stations to record the time the first timing message is received by the plurality of initiating wireless stations;
transmitting, by the responding wireless station to the plurality of initiating wireless stations, a time window, prior to transmitting the one or more timing messages, wherein:
   the transmission of the one or more timing messages comprises one or more timing messages within the time window, and
   the time window corresponds to a duration of time when resources of the responding wireless station are available to transmit the one or more timing messages;
receiving, by the responding wireless station from at least one of the plurality of initiating wireless stations, one or more trigger frames comprising an indication that the initiating wireless stations are available to receive the one or more timing messages, wherein:
   the one or more trigger frames are received within the time window, and
   the transmission of the one or more timing messages within the time window comprises the one or more timing messages responsive to receiving the one or more trigger frames.

13. The one or more non-transitory computer-readable media of claim 12, wherein the one-to-many communication protocol comprises a groupcast communication protocol.

14. The one or more non-transitory computer-readable media of claim 12, further comprising computer-executable instructions that, when executed by the at least one processor, configure the at least one processor to perform operations comprising:
   receiving, by the responding wireless station from the plurality of initiating wireless stations, requests to receive timing messages from the responding wireless station, and wherein the transmission of the time window is responsive to receiving the requests.

15. The one or more non-transitory computer-readable media of claim 12, further comprising computer-executable instructions that, when executed by the at least one processor, configure the at least one processor to perform operations comprising:
   transmitting, by the responding wireless station, a second timing message comprising a time that the first timing message was transmitted by the responding wireless station.

16. The one or more non-transitory computer-readable media of claim 12, further comprising computer-executable instructions that, when executed by the at least one processor, configure the at least one processor to perform operations comprising:
   receiving, by the responding wireless station and from at least one of the plurality of initiating wireless stations, an acknowledgement message and
   recording, by the responding wireless station and responsive to receiving the acknowledgement message, the time the acknowledgement message is received.

17. One or more non-transitory computer-readable media storing computer-executable instructions that, when executed by at least one processor, configure the at least one processor to perform operations comprising:
   receiving, by a initiating wireless station from a responding wireless station, a time window, wherein:
      one or more timing messages are received within the time window, and
      the time window corresponds to a duration of time when resources of the responding wireless station are available to transmit the one or more timing messages;
   transmitting, by the initiating wireless station, to the responding wireless station, and within the time window, one or more trigger frames comprising an indication that the initiating wireless station is available to receive the one or more timing messages, and wherein the one or more timing messages received within the time window are received in response to the one or more trigger frames;
   receiving, by the initiating wireless station, the one or more timing messages comprising timing data from the responding wireless station, wherein:
      the one or more timing messages are received using a one-to-many communication protocol, and
      the one or more timing messages comprise a plurality of unique identifiers associated with a plurality of initiating wireless stations including the initiating wireless station;
   identifying, based at least in part on the unique identifier associated with the initiating wireless station, timing data from the one or more timing messages;
   determining, by the initiating wireless station and based at least in part on the identified timing data, a first distance between the initiating wireless station and the responding wireless station.

18. The one or more non-transitory computer-readable media of claim 17, wherein the one-to-many communication protocol comprises a groupcast communication protocol.

19. The one or more non-transitory computer-readable media of claim 17, further comprising computer-executable instructions that, when executed by the at least one processor, configure the at least one processor to perform operations comprising:
   transmitting, by the initiating wireless station to the responding wireless station, a request to receive one or more timing messages and
   wherein the transmitting the request is prior to receiving the time window.

20. The one or more non-transitory computer-readable media of claim 17, further comprising computer-executable instructions that, when executed by the at least one processor, configure the at least one processor to perform operations comprising:
   receiving, by the initiating wireless station from the responding wireless station, a second timing message comprising a time that a first timing message was transmitted by the responding wireless station, and wherein the one or more timing messages comprise the first timing message.

21. The one or more non-transitory computer-readable media of claim 17, further comprising computer-executable instructions that, when executed by the at least one processor, configure the at least one processor to perform operations comprising:
   transmitting, by the initiating wireless station to the responding wireless station and responsive to receiving a first timing message from the responding wireless station, an acknowledgement message, wherein receipt, by the responding wireless station, of the acknowledgement message configures the responding wireless station to record the time the acknowledgement message is received.

22. The one or more non-transitory computer-readable media of claim 17, further comprising computer-executable instructions that, when executed by the at least one processor, configure the at least one processor to perform operations comprising:

receiving, by the initiating wireless station, one or more additional timing messages from a plurality of additional responding wireless stations, wherein the additional timing messages comprise respective additional timing data;

determining, by the initiating wireless station and based at least in part on the additional timing data, additional distances between the initiating wireless station and the plurality of additional responding wireless stations; and determining, by the initiating wireless station and based at least in part on the first distance and the additional distances, a location of the initiating wireless station.

* * * * *

UNITED STATES PATENT AND TRADEMARK OFFICE
CERTIFICATE OF CORRECTION

PATENT NO. : 9,538,321 B2
APPLICATION NO. : 14/335346
DATED : January 3, 2017
INVENTOR(S) : Segev It is certified that error appears in the above-identified patent and that said Letters Patent is hereby corrected as shown below:

In the Claims

Claim 10, Line 49, change "acknowledegement" to "acknowledgement".

Signed and Sealed this
Sixteenth Day of May, 2017

Michelle K. Lee
*Director of the United States Patent and Trademark Office*